(12) United States Patent
Zhang et al.

(10) Patent No.: US 12,320,959 B2
(45) Date of Patent: Jun. 3, 2025

(54) OPTICAL IMAGING SYSTEM

(71) Applicant: Zhejiang Sunny Optics Co., Ltd, Yuyao (CN)

(72) Inventors: Zhanfei Zhang, Yuyao (CN); Lin Huang, Yuyao (CN); Xin Zhou, Yuyao (CN); Fujian Dai, Yuyao (CN); Liefeng Zhao, Yuyao (CN)

(73) Assignee: Zhejiang Sunny Optics Co., Ltd, Yuyao (CN)

( * ) Notice: Subject to any disclaimer, the term of this patent is extended or adjusted under 35 U.S.C. 154(b) by 576 days.

(21) Appl. No.: 17/685,878

(22) Filed: Mar. 3, 2022

(65) Prior Publication Data

US 2022/0187577 A1 Jun. 16, 2022

Related U.S. Application Data

(63) Continuation of application No. PCT/CN2020/110042, filed on Aug. 19, 2020.

(30) Foreign Application Priority Data

Sep. 5, 2019 (CN) .......................... 201910835468.5

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC ....... G02B 13/0045; G02B 9/60; G02B 13/18
See application file for complete search history.

(56) References Cited

U.S. PATENT DOCUMENTS

| 9,933,600 | B1* | 4/2018 | Fang .................. G02B 9/60 |
| 2012/0218647 | A1 | 8/2012 | Yonezawa et al. |
| 2013/0215521 | A1 | 8/2013 | Chen |
| 2014/0254029 | A1* | 9/2014 | Hsu .................. G02B 13/18 |
|  |  |  | 359/713 |
| 2018/0074295 | A1* | 3/2018 | Lin ................ G02B 13/0045 |
| 2019/0271832 | A1* | 9/2019 | Kuo ............... G02B 13/0045 |
| 2019/0353874 | A1* | 11/2019 | Yeh ............... G02B 13/0045 |

(Continued)

FOREIGN PATENT DOCUMENTS

| CN | 201926811 U | 8/2011 |
| CN | 103913822 A | 7/2014 |
| CN | 105988190 A | 10/2016 |

(Continued)

OTHER PUBLICATIONS

International Search Report of PCT/CN2020/110042 dated Nov. 25, 2020 [PCT/ISA/210].

*Primary Examiner* — Cara E Rakowski
*Assistant Examiner* — Jennifer A Jones
(74) *Attorney, Agent, or Firm* — Sughrue Mion, PLLC

(57) ABSTRACT

An optical imaging system includes, sequentially from an object side to an image side along an optical axis, a first lens (L1) having a positive refractive power and a convex object-side surface (S1); a second lens (L2) having a refractive power; a third lens (L3) having a refractive power; a fourth lens (L4) having a positive refractive power, a concave object-side surface (S7) and a convex image-side surface (S8); and a fifth lens (L5) having a negative refractive power.

19 Claims, 14 Drawing Sheets

(56) References Cited

U.S. PATENT DOCUMENTS

2020/0096733 A1\* 3/2020 Wang ..................... G02B 9/60

FOREIGN PATENT DOCUMENTS

| | | |
|---|---|---|
| CN | 107167900 A | 9/2017 |
| CN | 108072968 A | 5/2018 |
| CN | 108388006 A | 8/2018 |
| CN | 207764461 U | 8/2018 |
| CN | 208172351 U | 11/2018 |
| CN | 109298516 A | 2/2019 |
| CN | 109683287 A | 4/2019 |
| CN | 210626763 U | 5/2020 |
| TW | 201534960 A | 9/2015 |

\* cited by examiner

OPTICAL IMAGING SYSTEM

CROSS-REFERENCE TO RELATED APPLICATION

This application is a continuation of International Application No. PCT/CN2020/110042, filed on Aug. 19, 2020, which claims priority to Chinese Patent Application No. 201910835468.5, filed before the China National Intellectual Property Administration (CNIPA) on Sep. 5, 2019. Both of the aforementioned applications are hereby incorporated by reference in their entireties.

TECHNICAL FIELD

The present disclosure relates to the field of optical components, and more specifically, relates to an optical imaging system including five lenses.

BACKGROUND

In recent years, with the development of science and technology, optical imaging systems have been playing an increasingly important role in many fields (such as mobile phone photography, machine vision, security monitoring, medical imaging, car driving, etc.). With the development of somatosensory game equipment and smartphone camera technology, the application of Time of Flight (TOF) has become more and more popular.

TOF is a depth information measurement solution, the equipment of which is mainly composed of infrared light projector and receiving module. The infrared light projector projects infrared light outward, and the infrared light is reflected after encountering the measured object and received by the receiving module. The solution calculates the depth information of the measured object by recording the time from emitting infrared light to receiving the infrared light, and completes 3D modeling. Compared with traditional two-dimensional imaging lens assemblies, TOF lens assemblies have more advantages in face recognition, stereo imaging, and somatosensory interaction.

SUMMARY

The present disclosure provides an optical imaging system which includes, sequentially from an object side to an image side along an optical axis, a first lens having a positive refractive power, and an object-side surface thereof may be convex; a second lens having a refractive power; a third lens having a refractive power; a fourth lens having a positive refractive power, an object-side surface thereof may be concave, and an image-side surface thereof may be convex; and a fifth lens having a negative refractive power.

In an embodiment, an axial distance SAG42 from an intersection of the image-side surface of the fourth lens and the optical axis to a vertex of an effective radius of the image-side surface of the fourth lens, an axial distance SAG51 from an intersection of an object-side surface of the fifth lens and the optical axis to a vertex of an effective radius of the object-side surface of the fifth lens and a distance Tr7r10 along the optical axis from the object-side surface of the fourth lens to an image-side surface of the fifth lens may satisfy: $-1<(SAG42+SAG51)/Tr7r10<-0.3$.

In an embodiment, a total effective focal length f of the optical imaging system, an entrance pupil diameter EPD of the optical imaging system and a distance TTL along the optical axis from the object-side surface of the first lens to an imaging plane of the optical imaging system may satisfy: $f \times TTL/EPD<6$ mm.

In an embodiment, an effective focal length f4 of the fourth lens and a total effective focal length f of the optical imaging system may satisfy: $0.8<f4/f \leq 1.5$.

In an embodiment, a distance TTL along the optical axis from the object-side surface of the first lens to an imaging plane of the optical imaging system may satisfy: $TTL<4.5$ mm.

In an embodiment, a total effective focal length f of the optical imaging system and an entrance pupil diameter EPD of the optical imaging system may satisfy: $f/EPD<1.5$.

In an embodiment, an effective focal length f1 of the first lens and a total effective focal length f of the optical imaging system may satisfy: $1.5<f1/f \leq 2.1$.

In an embodiment, a radius of curvature R7 of the object-side surface of the fourth lens and a total effective focal length f of the optical imaging system may satisfy: $-0.8<R7/f<-0.3$.

In an embodiment, a maximum distortion DISTmax of the optical imaging system may satisfy: $DISTmax<3\%$.

In an embodiment, a spaced interval T12 between the first lens and the second lens along the optical axis, a spaced interval T23 between the second lens and the third lens along the optical axis and a spaced interval T34 between the third lens and the fourth lens along the optical axis may satisfy: $0.35<T34/(T12+T23)<0.7$.

In an embodiment, a spaced interval T45 between the fourth lens and the fifth lens along the optical axis and a spaced interval TD from the object-side surface of the first lens to an image-side surface of the fifth lens may satisfy: $10 \times T45/TD<0.5$.

In an embodiment, a center thickness CT2 of the second lens along the optical axis and a center thickness CT4 of the fourth lens along the optical axis may satisfy: $0.2<CT2/CT4<0.5$.

In an embodiment, a center thickness CT2 of the second lens along the optical axis and an edge thickness ET2 of the second lens may satisfy: $0.9<CT2/ET2<1.65$.

In an embodiment, an effective half-aperture DT12 of an image-side surface of the first lens and an effective half-aperture DT21 of an object-side surface of the second lens may satisfy: $0.9<DT12/DT21<1.2$.

In an embodiment, an effective half-aperture DT21 of an object-side surface of the second lens and an effective half-aperture DT31 of an object-side surface of the third lens may satisfy: $0.8<DT21/DT31<1.2$.

In an embodiment, an axial distance SAG21 from an intersection of an object-side surface of the second lens and the optical axis to a vertex of an effective radius of the object-side surface of the second lens and a center thickness CT2 of the second lens along the optical axis may satisfy: $-0.7<SAG21/CT2<0$.

In an embodiment, an axial distance SAG31 from an intersection of an object-side surface of the third lens and the optical axis to a vertex of an effective radius of the object-side surface of the third lens and a center thickness CT3 of the third lens along the optical axis may satisfy: $-0.9<SAG31/CT3<-0.2$.

In an embodiment, an effective half-aperture DT52 of an image-side surface of the fifth lens and a half of a diagonal length ImgH of an effective pixel area on an imaging plane of the optical imaging system may satisfy: $0.8<DT52/ImgH<1$.

The present disclosure employs five lenses, and the above optical imaging system has at least one beneficial effect, such as low distortion, high brightness, miniaturization, and large aperture, by rationally configuring the refractive power, the surface type and the center thickness of each lens, and the axial spaced interval between the lenses and the like.

BRIEF DESCRIPTION OF THE DRAWINGS

Other features, objectives, and advantages of the present disclosure will become more apparent from the following detailed description of the non-limiting embodiments with reference to the accompanying drawings. In the drawings.

DETAILED DESCRIPTION OF EMBODIMENTS

Figure 1:
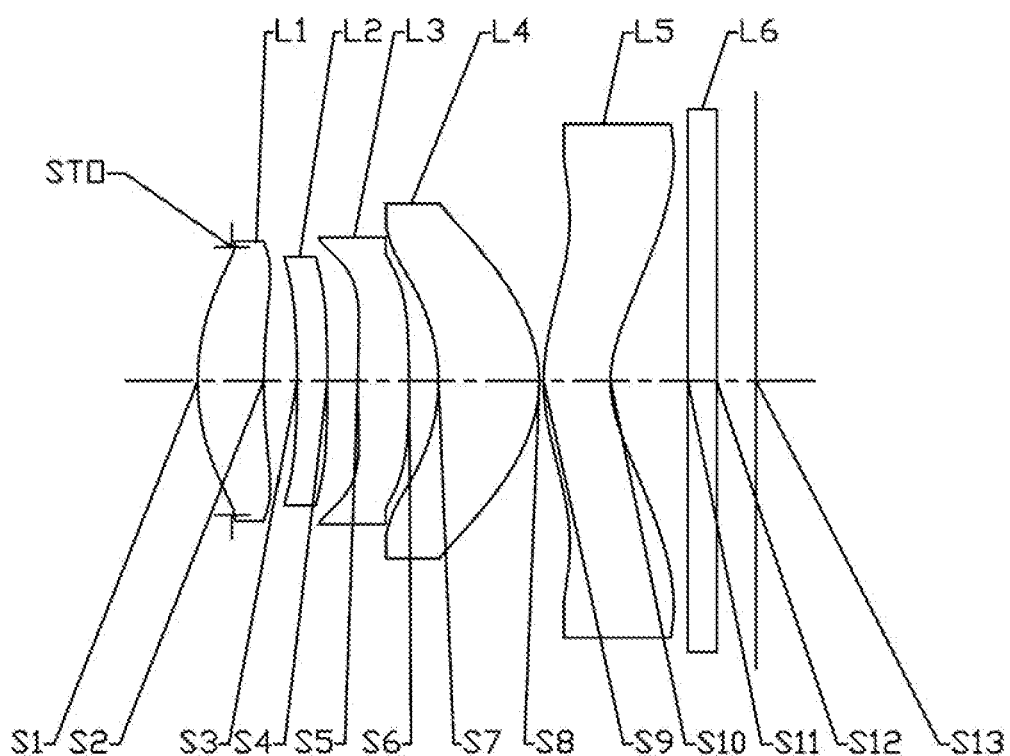
FIG. 1 illustrates a schematic structural diagram of an optical imaging system according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex surface is not defined, it indicates that the surface of the lens is convex at least in the paraxial region; and if a surface of a lens is concave and the position of the concave surface is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include, for example, five lenses having refractive powers, that is, a first lens, a second lens, a third lens, a fourth lens and a fifth lens. The five lenses are arranged sequentially from an object side to an image side along an optical axis. Among the first lens to the fifth lens, there may be an air interval between any two adjacent lenses.

In an exemplary embodiment, the first lens may have a positive refractive power and an object-side surface thereof may be convex; the second lens has a positive or negative refractive power; the third lens has a positive or negative refractive power; the fourth lens may have a positive refractive power, an object-side surface thereof may be concave and an image-side surface thereof may be convex; and the fifth lens may have a negative refractive power. The low-order aberrations of the system are effectively compensated by rationally controlling the positive and negative distribution of the refractive powers and the surface curvature of each component in the system.

In an exemplary embodiment, the optical imaging system according to the present disclosure may satisfy: $-1<$ (SAG42+SAG51)/Tr7r10$<-0.3$, where SAG42 is an axial distance from an intersection of the image-side surface of the fourth lens and the optical axis to a vertex of an effective radius of the image-side surface of the fourth lens, SAG51 is an axial distance from an intersection of an object-side surface of the fifth lens and the optical axis to a vertex of an effective radius of the object-side surface of the fifth lens, and Tr7r10 is a distance along the optical axis from the object-side surface of the fourth lens to an image-side surface of the fifth lens. More specifically, SAG42, SAG51 and Tr7r10 may satisfy: $-0.68<$(SAG42+SAG51)/Tr7r10$<-0.36$. By controlling the sag height of the vertex of the effective radius of the image-side surface of the fourth lens, the sag height of the vertex of the effective radius of the object-side surface of the fifth lens and the axial distance from the object-side surface of the fourth lens to the image-side surface of the fifth lens, it is beneficial to have sufficient space between the fourth lens and the fifth lens, so that the surface of the fourth lens and the surface of the fifth lens have a high degree of freedom change, which is beneficial to better correct the astigmatic and field curvature of the optical imaging system, thereby improving the image quality of the optical imaging system.

In an exemplary embodiment, the optical imaging system according to the present disclosure may satisfy: f×TTL/EPD<6 mm, where f is a total effective focal length of the optical imaging system, EPD is an entrance pupil diameter of the optical imaging system, and TTL is a distance along the optical axis from the object-side surface of the first lens to an imaging plane of the optical imaging system. More specifically, f, EPD and TTL may satisfy: 5.0 mm<f×TTL/EPD<5.7 mm. By matching the total effective focal length, entrance pupil diameter and total optical length of the optical imaging system, it is beneficial to miniaturize the optical imaging system and have a large aperture, thereby having a larger amount of light transmission and better relative illumination. The optical imaging system may be used in portable electronic products with small installation space.

In an exemplary embodiment, the optical imaging system according to the present disclosure may satisfy: 0.8<f4/f≤1.5, where f4 is an effective focal length of the fourth lens, and f is a total effective focal length of the optical imaging system. More specifically, f4 and f may satisfy: 0.81<f4/f≤1.5. By controlling the ratio of the effective focal length of the fourth lens to the total effective focal length, it is beneficial to avoid excessive light deflection at the fourth lens. In addition, it is also beneficial to better correct the field curvature of the optical imaging system.

In an exemplary embodiment, the optical imaging system according to the present disclosure may satisfy: TTL<4.5 mm, where TTL is a distance along the optical axis from the object-side surface of the first lens to an imaging plane of the optical imaging system. More specifically, TTL may satisfy: 4 mm<TTL<4.21 mm. By controlling the total optical length of the optical imaging system, it is beneficial to miniaturize the optical imaging system.

In an exemplary embodiment, the optical imaging system according to the present disclosure may satisfy: f/EPD<1.5, where f is a total effective focal length of the optical imaging system, and EPD is an entrance pupil diameter of the optical imaging system. More specifically, f and EPD may satisfy: 1.21<f/EPD<1.39. By controlling the ratio of the total effective focal length to the entrance pupil diameter of the optical imaging system, the optical imaging system may have a larger aperture and a higher light throughput, thereby increasing the imaging effect of the optical imaging system when working in a dark environment. In addition, it is also beneficial to reduce the aberration of the fringe field-of-view.

In an exemplary embodiment, the optical imaging system according to the present disclosure may satisfy: 1.5<f1/f<2.1, where f1 is an effective focal length of the first lens, and f is a total effective focal length of the optical imaging system. More specifically, f1 and f may satisfy: 1.53<f1/f<2.03. By controlling the ratio of the effective focal length of the first lens to the total effective focal length, it is beneficial to improve the chromatic aberration of the optical imaging system, and beneficial to adjust the focus position of the light, thereby improving the ability of the optical imaging system to converge light.

In an exemplary embodiment, the optical imaging system according to the present disclosure may satisfy: $-0.8<$R7/f$<-0.3$, where R7 is a radius of curvature of the object-side surface of the fourth lens, and f is a total effective focal length of the optical imaging system. More specifically, R7 and f may satisfy: $-0.65<$R7/f$<-0.45$. By controlling the ratio of the radius of curvature of the object-side surface of the fourth lens to the total effective focal length, it is beneficial to match the light angle at the imaging plane of the optical imaging system with the chief ray angle (CRA) of the photosensitive chip, thereby improving the image quality of the optical imaging system.

In an exemplary embodiment, the optical imaging system according to the present disclosure may satisfy: DISTmax<3%, where DISTmax is a maximum distortion of the optical imaging system. More specifically, DISTmax may satisfy: DISTmax<2.6%. By controlling the distortion of the optical imaging system, it is beneficial to reduce the astigmatic of the optical imaging system and improve the relative illumination. At the same time, it is beneficial to improve the image quality of the optical imaging system.

In an exemplary embodiment, the optical imaging system according to the present disclosure may satisfy: 0.35<T34/(T12+T23)<0.7, where T12 is a spaced interval between the first lens and the second lens along the optical axis, T23 is a spaced interval between the second lens and the third lens along the optical axis, and T34 is a spaced interval between the third lens and the fourth lens along the optical axis. More specifically, T12, T23 and T34 may satisfy: 0.36<T34/(T12+T23)<0.66. By controlling the air interval between adjacent lenses in the first lens to the fourth lens, the total optical length of the optical imaging system may be effectively controlled, which is beneficial to the miniaturization of the optical imaging system.

In an exemplary embodiment, the optical imaging system according to the present disclosure may satisfy: 10×T45/TD<0.5, where T45 is a spaced interval between the fourth lens and the fifth lens along the optical axis, and TD is a spaced interval from the object-side surface of the first lens to an image-side surface of the fifth lens. More specifically, T45 and TD may satisfy: 0.09<10×T45/TD<0.45. By controlling the ratio of the axial distance between the fourth lens and the fifth lens to the axial distance from the object-side surface of the first lens to the image-side surface of the fifth lens, it is beneficial to shorten the total length of the optical imaging system, so that the optical imaging system has the characteristics of lightness and thinness. At the same time, the structure of the optical imaging system is adjusted, thereby reducing the difficulty of processing and assembly of each lens.

In an exemplary embodiment, the optical imaging system according to the present disclosure may satisfy: 0.2<CT2/CT4<0.5, where CT2 is a center thickness of the second lens along the optical axis, and CT4 is a center thickness of the fourth lens along the optical axis. More specifically, CT2 and CT4 may satisfy: 0.26<CT2/CT4<0.42. By controlling the ratio of the center thickness of the second lens to the center thickness of the fourth lens, it is beneficial to have enough space between the lenses of the optical imaging system, so that the surface of each lens has a higher degree of freedom. At the same time, it is beneficial to better correct the field curvature and astigmatic of the optical imaging system.

In an exemplary embodiment, the optical imaging system according to the present disclosure may satisfy: 0.9<CT2/ET2<1.65, where CT2 is a center thickness of the second lens along the optical axis, and ET2 is an edge thickness of the second lens. More specifically, CT2 and ET2 may satisfy: 0.93<CT2/ET2<1.64. By controlling the ratio of the center thickness of the second lens to the edge thickness of the second lens, it is beneficial to reduce the difficulty of processing and assembly of the second lens.

In an exemplary embodiment, the optical imaging system according to the present disclosure may satisfy: 0.9<DT12/DT21<1.2, where DT12 is an effective half-aperture of an image-side surface of the first lens, and DT21 is an effective half-aperture of an object-side surface of the second lens. More specifically, DT12 and DT21 may satisfy: 0.95<DT12/DT21<1.15. By matching the effective half-aperture of the image-side surface of the first lens with the effective half-aperture of the object-side surface of the second lens, it is beneficial to make the optical imaging system better correct the off-axis aberration, thereby making the optical imaging system have a higher image quality.

In an exemplary embodiment, the optical imaging system according to the present disclosure may satisfy: 0.8<DT21/DT31<1.2, where DT21 is an effective half-aperture of an object-side surface of the second lens, and DT31 is an effective half-aperture of an object-side surface of the third lens. More specifically, DT21 and DT31 may satisfy: 0.85<DT21/DT31<1.08. By matching the effective half-aperture of the object-side surface of the second lens with the effective half-aperture of the object-side surface of the third lens, it is beneficial to reduce the difficulty of assembling the second lens and the third lens, and beneficial to make the optical imaging system have less aberration.

In an exemplary embodiment, the optical imaging system according to the present disclosure may satisfy: −0.7<SAG21/CT2<0, where SAG21 is an axial distance from an intersection of an object-side surface of the second lens and the optical axis to a vertex of an effective radius of the object-side surface of the second lens, and CT2 is a center thickness of the second lens along the optical axis. More specifically, SAG21 and CT2 may satisfy: −0.7<SAG21/CT2<−0.1. By controlling the ratio of the sag height of the vertex of the effective radius of the object-side surface of the second lens to the center thickness of the second lens, the relative brightness of the optical imaging system may be effectively improved.

In an exemplary embodiment, the optical imaging system according to the present disclosure may satisfy: −0.9<SAG31/CT3<−0.2, where SAG31 is an axial distance from an intersection of an object-side surface of the third lens and the optical axis to a vertex of an effective radius of the object-side surface of the third lens, and CT3 is a center thickness of the third lens along the optical axis. More specifically, SAG31 and CT3 may satisfy: −0.89<SAG31/CT3<−0.41. By controlling the ratio of the sag height of the vertex of the effective radius of the object-side surface of the third lens to the center thickness of the third lens, the chief ray angle of the optical imaging system may be adjusted effectively, and the image quality of the optical imaging system may be improved.

In an exemplary embodiment, the optical imaging system according to the present disclosure may satisfy: 0.8<DT52/ImgH<1, where DT52 is an effective half-aperture of an image-side surface of the fifth lens, and ImgH is a half of a diagonal length of an effective pixel area on an imaging plane of the optical imaging system. More specifically, DT52 and ImgH may satisfy: 0.87<DT52/ImgH<0.93. By controlling the ratio of the effective half-aperture of the image side surface of the fifth lens to the image height, it is beneficial to enable the optical imaging system to have a good ability to compensate aberrations.

In an exemplary embodiment, the above optical imaging system may further include at least one stop. The stop may be disposed at an appropriate position as required, for example, between the object and the first lens. Optionally, the above optical imaging system may further include an optical filter for correcting the color deviation and/or a protective glass for protecting the photosensitive element located on an imaging plane.

The optical imaging system according to the above embodiments of the present disclosure may employ a plurality of lenses, such as five lenses as described above. By properly configuring the refractive powers of the lenses, the surface types of the lenses, the center thicknesses of the lenses, and spaced intervals along the optical axis between the lenses, the size and the sensitivity of the imaging system may be effectively reduced, and the processability of the imaging system may be improved, such that the optical imaging system is more suitable for processing and production, and may be applied to portable electronic products. At the same time, the optical imaging system of the present disclosure also has excellent optical properties such as low distortion, high brightness, and large aperture, as well as the characteristics of miniaturization and thinness. The optical imaging system according to the present disclosure may be applied to the infrared band and TOF technology, and may provide better imaging effects in aspects such as face recognition, stereoscopic imaging, and somatosensory interaction.

In the embodiments of the present disclosure, at least one of the surfaces of the lenses is aspheric, that is, at least one of the surfaces from the object-side surface of the first lens to the image-side surface of the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With an aspheric lens, the aberrations that occur during imaging may be eliminated as much as possible, and thus improving the image quality. Optionally, at least one of the object-side surface and the image-side surface of each of the first lens, the second lens, the third lens, the fourth lens and the fifth lens is aspheric. Optionally, the object-side surface and the image-side surface of each of the first lens, the second lens, the third lens, the fourth lens and the fifth lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking five lenses as an example, the optical imaging system is not limited to including five lenses. The optical imaging system may alternatively include other numbers of lenses if desired.

Some specific examples of an optical imaging system applicable to the above embodiment will be further described below with reference to the accompanying drawings.

Example 1

An optical imaging system according to example 1 of the present disclosure is described below with reference to FIG. 1 to FIG. 2C. FIG. 1 shows a schematic structural diagram of the optical imaging system according to example 1 of the present disclosure.

As shown in FIG. 1, the optical imaging system includes a stop STO, a first lens L1, a second lens L2, a third lens L3, a fourth lens L4, a fifth lens L5 and an optical filter L6, which are sequentially arranged from an object side to an image side along an optical axis.

The first lens L1 has a positive refractive power, an object-side surface S1 thereof is convex, and an image-side surface S2 thereof is concave. The second lens L2 has a negative refractive power, an object-side surface S3 thereof is concave, and an image-side surface S4 thereof is convex. The third lens L3 has a positive refractive power, an object-side surface S5 thereof is convex, and an image-side surface S6 thereof is convex. The fourth lens L4 has a positive refractive power, an object-side surface S7 thereof is concave, and an image-side surface S8 thereof is convex. The fifth lens L5 has a negative refractive power, an object-side surface S9 thereof is convex, and an image-side surface S10 thereof is concave. The optical filter L6 has an object-side surface S11 and an image-side surface S12. The optical imaging system has an imaging plane S13, light from an object sequentially passes through the respective surfaces S1 to S12 and is finally imaged on the imaging plane S13.

Table 1 is a table illustrating basic parameters of the optical imaging system of example 1, wherein the units of the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.2500 | | | | |
| S1 | Aspheric | 1.6896 | 0.4810 | 1.62 | 23.5 | 4.27 | −1.0727 |
| S2 | Aspheric | 4.1957 | 0.2381 | | | | −61.0870 |
| S3 | Aspheric | −10.1757 | 0.2200 | 1.63 | 20.4 | −33.00 | 96.0659 |
| S4 | Aspheric | −19.9960 | 0.2213 | | | | 94.5039 |
| S5 | Aspheric | 6.0937 | 0.3747 | 1.63 | 20.4 | 5.80 | −25.0584 |
| S6 | Aspheric | −9.0124 | 0.2144 | | | | −5.7586 |
| S7 | Aspheric | −1.2973 | 0.7352 | 1.62 | 23.5 | 3.10 | 0.0299 |
| S8 | Aspheric | −0.9405 | 0.0300 | | | | −1.9151 |
| S9 | Aspheric | 1.4934 | 0.4874 | 1.62 | 23.5 | −4.20 | −0.6412 |
| S10 | Aspheric | 0.8292 | 0.5634 | | | | −3.7314 |
| S11 | Spherical | Infinite | 0.2100 | 1.52 | 64.2 | | |
| S12 | Spherical | Infinite | 0.2869 | | | | |
| S13 | Spherical | Infinite | | | | | |

In example 1, a total effective focal length f of the optical imaging system is 2.54 mm, and an axial distance TTL from the object-side surface S1 of the first lens L1 to the imaging plane S13 is 4.06 mm.

In example 1, the object-side surface and the image-side surface of any one of the first lens L1 to the fifth lens L5 are aspheric. The surface type x of each aspheric lens may be defined by using, but not limited to, the following aspheric formula:

$$x = \frac{ch^2}{1+\sqrt{1-(k+1)c^2h^2}} + \sum A_i h^i \qquad (1)$$

Here, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; $A_i$ is a correction coefficient of the i-th order of the aspheric surface. Table 2 below shows high-order coefficients A4, A6, A8, A10, A12, A14, A16, A18 and A20 applicable to the aspheric surfaces S1 to S10 according to example 1.

TABLE 2

| Surface number | A4 | A6 | A8 | A10 | A12 |
|---|---|---|---|---|---|
| S1 | 4.4473E−02 | −3.1426E−01 | 2.5283E+00 | −1.1557E+01 | 3.1356E+01 |
| S2 | 2.1374E−02 | 5.4529E−01 | −4.7141E+00 | 1.8564E+01 | −4.4004E+01 |
| S3 | −9.2178E−02 | 5.2659E−01 | −3.8330E+00 | 1.4834E+01 | −3.4267E+01 |
| S4 | −6.1528E−02 | −3.3140E−01 | 1.3818E+00 | −3.0617E+00 | 3.1364E+00 |
| S5 | −2.3438E−01 | 8.0369E−01 | −5.7540E+00 | 2.0011E+01 | −4.3381E+01 |
| S6 | −1.0462E−01 | −1.0184E−01 | 3.3624E−01 | −2.4924E+00 | 7.6637E+00 |
| S7 | 1.6606E−01 | −3.9444E−01 | 5.8771E−01 | 2.5262E−01 | −2.9280E+00 |
| S8 | 6.4442E−02 | −3.7366E−01 | 7.8553E−01 | −1.1443E+00 | 1.1185E+00 |
| S9 | −2.1409E−01 | −3.9701E−03 | 1.8514E−01 | −2.8377E−01 | 2.3472E−01 |
| S10 | −8.3102E−02 | 5.2644E−02 | −2.9775E−02 | 8.5152E−03 | 3.6063E−04 |

| Surface number | A14 | A16 | A18 | A20 |
|---|---|---|---|---|
| S1 | −5.1886E+01 | 5.1156E+01 | −2.7614E+01 | 6.2691E+00 |
| S2 | 6.3926E+01 | −5.5909E+01 | 2.7103E+01 | −5.6024E+00 |
| S3 | 4.7966E+01 | −3.9401E+01 | 1.7434E+01 | −3.2020E+00 |
| S4 | −3.8090E−01 | −1.6234E+00 | 9.1151E−01 | −7.0614E−02 |
| S5 | 5.7879E+01 | −4.6540E+01 | 2.0959E+01 | −4.0656E+00 |
| S6 | −1.2941E+01 | 1.2746E+01 | −6.6665E+00 | 1.4141E+00 |
| S7 | 6.0086E+00 | −5.7571E+00 | 2.6961E+00 | −5.0242E−01 |
| S8 | −6.4441E−01 | 1.7353E−01 | −1.3786E−01 | −6.0262E−03 |
| S9 | −1.1870E−01 | 3.6618E−02 | −6.3049E−03 | 4.6238E−04 |
| S10 | −1.0498E−03 | 2.9357E−04 | −3.0251E−05 | 6.9955E−07 |

Figures 2A, 2B:
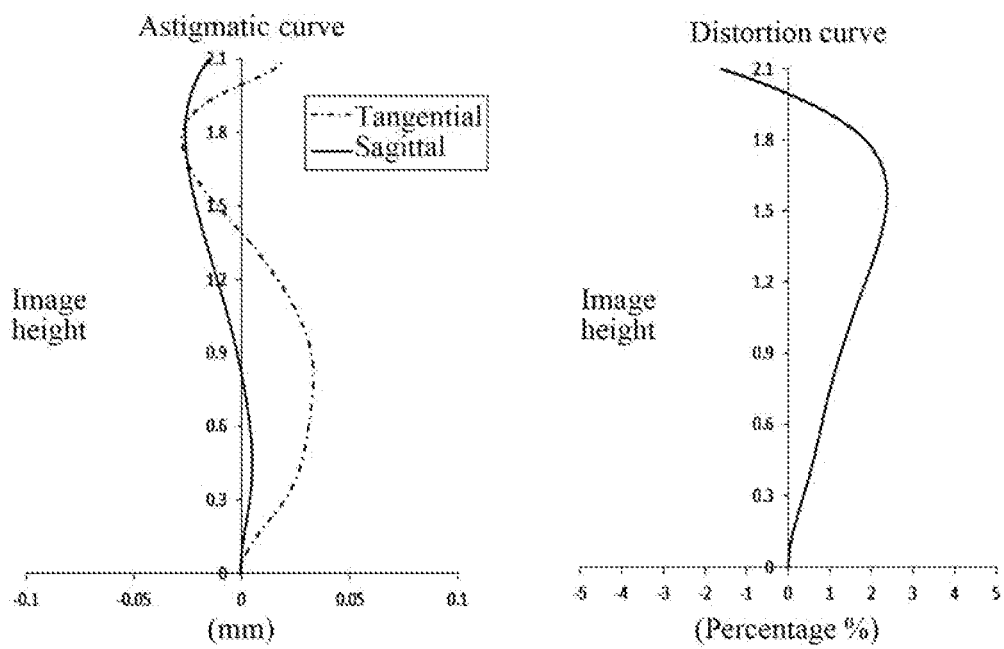
FIGS. 2A to 2C illustrate astigmatic curves, a distortion curve, and a relative illumination curve of the optical imaging system of the example 1, respectively.
Figure 2C:
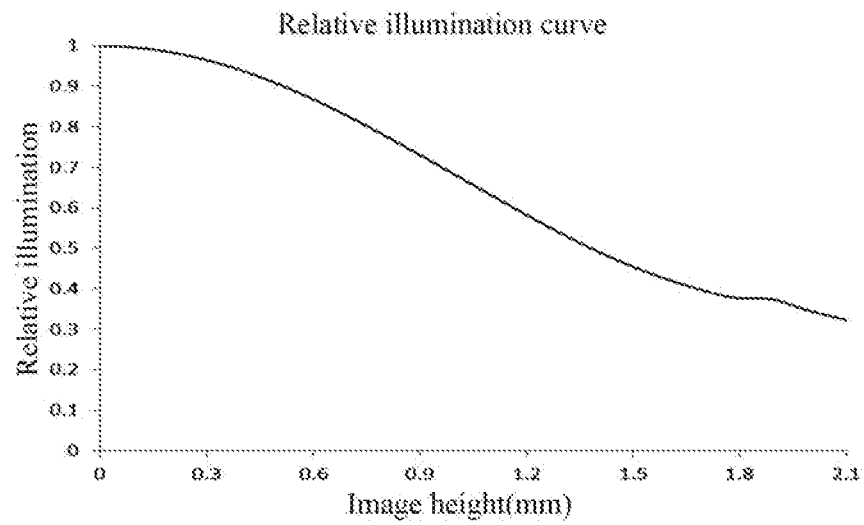

FIG. 2A illustrates astigmatic curves of the optical imaging system according to example 1, representing the curvatures of a tangential plane and the curvatures of a sagittal plane. FIG. 2B illustrates a distortion curve of the optical imaging system according to example 1, representing the amounts of distortion corresponding to different image heights. FIG. 2C illustrates a relative illumination curve of the optical imaging system according to example 1, representing the relative illumination corresponding to different image heights on the imaging plane. It can be seen from FIG. 2A to FIG. 2C that the optical imaging system provided in example 1 may achieve a good image quality.

Example 2

Figure 3:
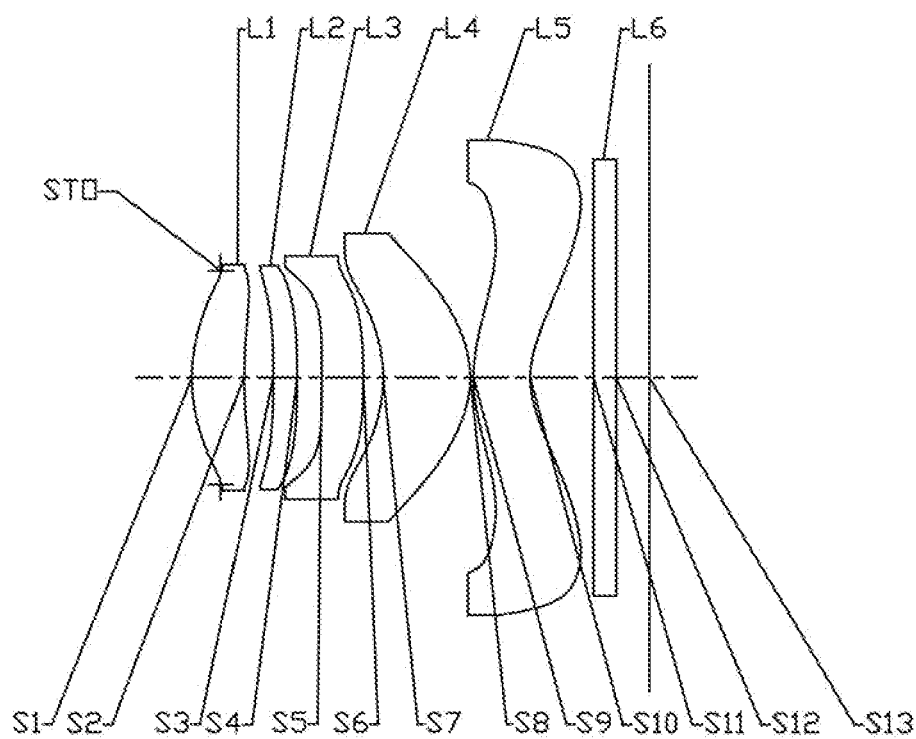
FIG. 3 illustrates a schematic structural diagram of an optical imaging system according to example 2 of the present disclosure.

An optical imaging system according to example 2 of the present disclosure is described below with reference to FIG. 3 to FIG. 4C. In this example and the following examples, for the purpose of brevity, the description of parts similar to those in example 1 will be omitted. FIG. 3 shows a schematic structural diagram of the optical imaging system according to example 2 of the present disclosure.

As shown in FIG. 3, the optical imaging system includes a stop STO, a first lens L1, a second lens L2, a third lens L3, a fourth lens L4, a fifth lens L5 and an optical filter L6, which are sequentially arranged from an object side to an image side along an optical axis.

The first lens L1 has a positive refractive power, an object-side surface S1 thereof is convex, and an image-side surface S2 thereof is concave. The second lens L2 has a positive refractive power, an object-side surface S3 thereof is concave, and an image-side surface S4 thereof is convex. The third lens L3 has a positive refractive power, an object-side surface S5 thereof is convex, and an image-side surface S6 thereof is convex. The fourth lens L4 has a positive refractive power, an object-side surface S7 thereof is concave, and an image-side surface S8 thereof is convex. The fifth lens L5 has a negative refractive power, an object-side surface S9 thereof is convex, and an image-side surface S10 thereof is concave. The optical filter L6 has an object-side surface S11 and an image-side surface S12. The optical imaging system has an imaging plane S13, light from an object sequentially passes through the respective surfaces S1 to S12 and is finally imaged on the imaging plane S13.

In example 2, a total effective focal length f of the optical imaging system is 2.60 mm, and an axial distance TTL from the object-side surface S1 of the first lens L1 to the imaging plane S13 is 4.20 mm.

Table 3 is a table illustrating basic parameters of the optical imaging system of example 2, wherein the units of the radius of curvature, the thickness/distance and the focal length are millimeter (mm). Table 4 shows high-order coefficients applicable to each aspheric surface in example 2, wherein the surface type of each aspheric surface may be defined by the formula (1) given in the above example 1.

TABLE 3

| Surface number | Surface type | Radius of curvature | Thickness/ Distance | Material | | Focal length | Conic coefficient |
|---|---|---|---|---|---|---|---|
| | | | | Refractive index | Abbe number | | |
| OBJ | Spherical | Infinite | Infinite | | | | |
| STO | Spherical | Infinite | −0.2630 | | | | |
| S1 | Aspheric | 1.7151 | 0.4737 | 1.62 | 23.5 | 4.29 | −1.0522 |
| S2 | Aspheric | 4.3471 | 0.2683 | | | | −67.6453 |
| S3 | Aspheric | −10.2598 | 0.2200 | 1.63 | 20.4 | 99.08 | 95.4510 |
| S4 | Aspheric | −8.8915 | 0.2229 | | | | 40.9785 |
| S5 | Aspheric | 66.8307 | 0.3840 | 1.63 | 20.4 | 8.04 | 99.0000 |

TABLE 3-continued

| Surface number | Surface type | Radius of curvature | Thickness/ Distance | Material Refractive index | Abbe number | Focal length | Conic coefficient |
|---|---|---|---|---|---|---|---|
| S6 | Aspheric | −5.5037 | 0.1824 | | | | −32.9994 |
| S7 | Aspheric | −1.3203 | 0.7998 | 1.62 | 23.5 | 3.22 | 0.0264 |
| S8 | Aspheric | −0.9766 | 0.0300 | | | | −1.9066 |
| S9 | Aspheric | 1.5107 | 0.5206 | 1.62 | 23.5 | −4.49 | −0.6780 |
| S10 | Aspheric | 0.8489 | 0.5806 | | | | −3.6603 |
| S11 | Spherical | Infinite | 0.2100 | 1.52 | 64.2 | | |
| S12 | Spherical | Infinite | 0.3041 | | | | |
| S13 | Spherical | Infinite | | | | | |

TABLE 4

| Surface number | A4 | A6 | A8 | A10 | A12 |
|---|---|---|---|---|---|
| S1 | 3.6690E−02 | −1.9950E−01 | 1.5932E+00 | −7.2355E+00 | 1.9517E+01 |
| S2 | 2.0062E−02 | 5.1289E−01 | −4.4304E+00 | 1.7372E+01 | −4.0978E+01 |
| S3 | −1.0532E−01 | 5.0246E−01 | −3.5704E+00 | 1.3503E+01 | −3.0322E+01 |
| S4 | −4.6663E−02 | −3.2859E−01 | 1.2859E+00 | −2.7585E+00 | 2.7354E+00 |
| S5 | −2.3931E−01 | 7.7869E−01 | −5.6314E+00 | 1.9731E+01 | −4.2992E+01 |
| S6 | −1.5013E−01 | 3.9380E−01 | −2.6207E+00 | 8.2488E+00 | −1.5834E+01 |
| S7 | 1.5669E−01 | −2.3563E−02 | −1.4311E+00 | 6.7565E+00 | −1.5859E+01 |
| S8 | 2.5291E−02 | −1.2275E−01 | −5.3661E−02 | 6.1437E−01 | −1.2135E+00 |
| S9 | −1.9955E−01 | 1.1378E−02 | 1.2383E−01 | −1.9082E−01 | 1.5140E−01 |
| S10 | −7.6999E−02 | 4.8611E−02 | −2.8744E−02 | 8.4978E−03 | 3.3614E−04 |

| Surface number | A14 | A16 | A18 | A20 |
|---|---|---|---|---|
| S1 | −3.2229E+01 | 3.1771E+01 | −1.7181E+01 | 3.9112E+00 |
| S2 | 5.9363E+01 | −5.1866E+01 | 2.5123E+01 | −5.1818E+00 |
| S3 | 4.1126E+01 | −3.2543E+01 | 1.3753E+01 | −2.3873E+00 |
| S4 | −2.3251E−01 | −1.4786E+00 | 7.8063E−01 | −4.9992E−02 |
| S5 | 5.7650E+01 | −4.6671E+01 | 2.1225E+01 | −4.1772E+00 |
| S6 | 1.8397E+01 | −1.2232E+01 | 4.2604E+00 | −6.0171E−01 |
| S7 | 2.1575E+01 | −1.6782E+01 | 6.9193E+00 | −1.1759E+00 |
| S8 | 1.2690E+00 | −7.5993E−01 | 2.4534E−01 | −3.3096E−02 |
| S9 | −7.1516E−02 | 2.0090E−02 | −3.0699E−03 | 1.9335E−04 |
| S10 | −1.0544E−03 | 2.9296E−04 | −3.0220E−05 | 7.3266E−07 |

Figure 4A:
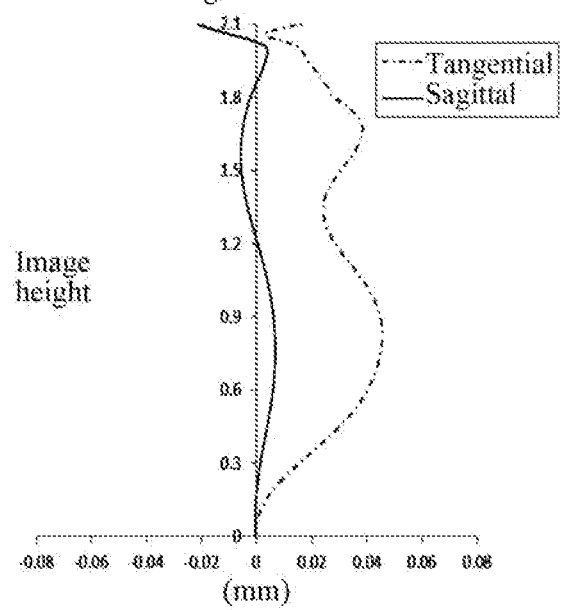
FIGS. 4A to 4C illustrate astigmatic curves, a distortion curve, and a relative illumination curve of the optical imaging system of the example 2, respectively.
Figure 4B:
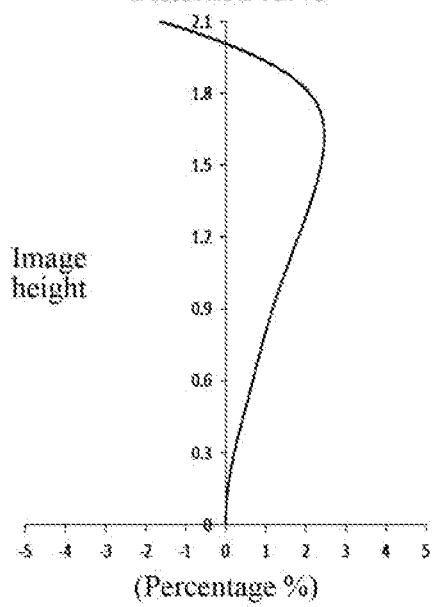
Figure 4C:
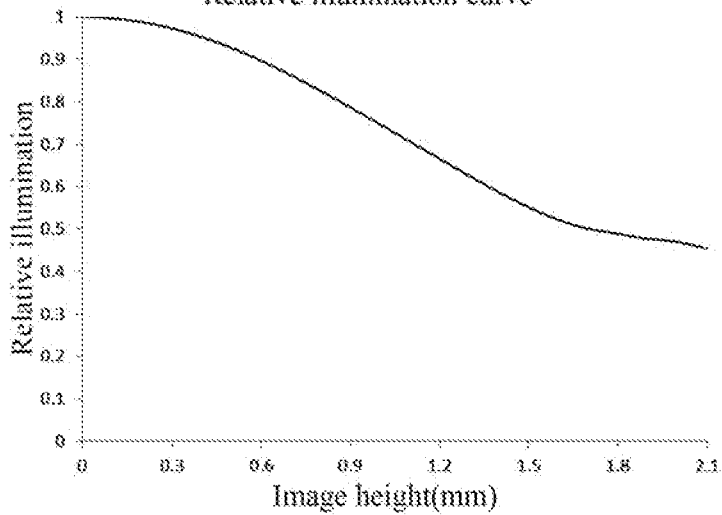

FIG. 4A illustrates astigmatic curves of the optical imaging system according to example 2, representing the curvatures of a tangential plane and the curvatures of a sagittal plane. FIG. 4B illustrates a distortion curve of the optical imaging system according to example 2, representing the amounts of distortion corresponding to different image heights. FIG. 4C illustrates a relative illumination curve of the optical imaging system according to example 2, representing the relative illumination corresponding to different image heights on the imaging plane. It can be seen from FIG. 4A to FIG. 4C that the optical imaging system provided in example 2 may achieve a good image quality.

Example 3

Figure 5:
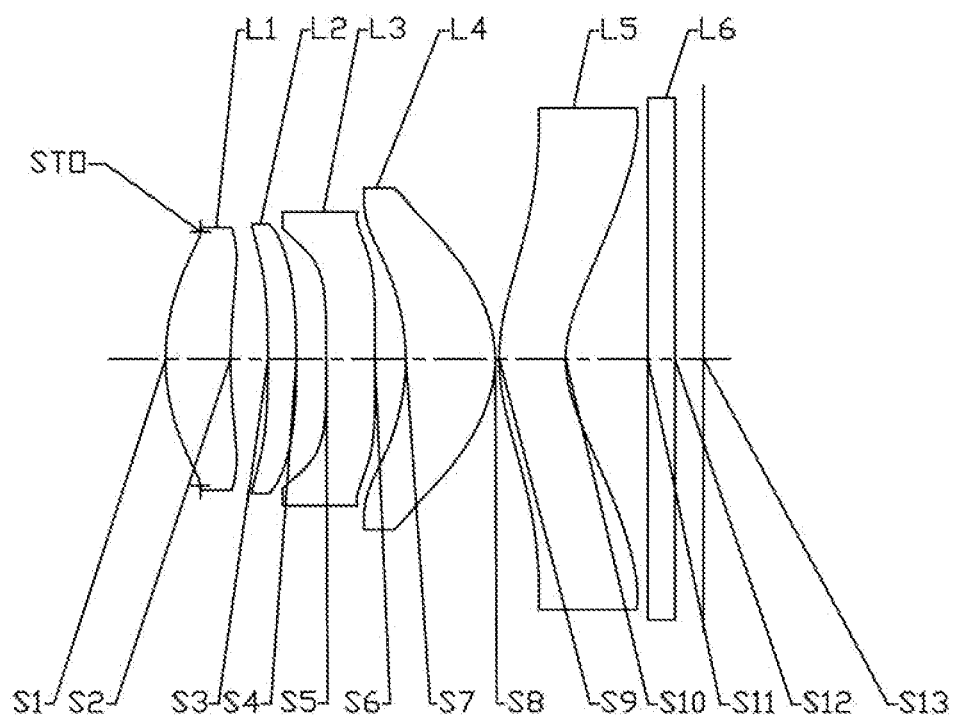
FIG. 5 illustrates a schematic structural diagram of an optical imaging system according to example 3 of the present disclosure.

An optical imaging system according to example 3 of the present disclosure is described below with reference to FIG. 5 to FIG. 6C. FIG. 5 shows a schematic structural diagram of the optical imaging system according to example 3 of the present disclosure.

As shown in FIG. 5, the optical imaging system includes a stop STO, a first lens L1, a second lens L2, a third lens L3, a fourth lens L4, a fifth lens L5 and an optical filter L6, which are sequentially arranged from an object side to an image side along an optical axis.

The first lens L1 has a positive refractive power, an object-side surface S1 thereof is convex, and an image-side surface S2 thereof is concave. The second lens L2 has a positive refractive power, an object-side surface S3 thereof is concave, and an image-side surface S4 thereof is convex. The third lens L3 has a negative refractive power, an object-side surface S5 thereof is convex, and an image-side surface S6 thereof is concave. The fourth lens L4 has a positive refractive power, an object-side surface S7 thereof is concave, and an image-side surface S8 thereof is convex. The fifth lens L5 has a negative refractive power, an object-side surface S9 thereof is convex, and an image-side surface S10 thereof is concave. The optical filter L6 has an object-side surface S11 and an image-side surface S12. The optical imaging system has an imaging plane S13, light from an object sequentially passes through the respective surfaces S1 to S12 and is finally imaged on the imaging plane S13.

In example 3, a total effective focal length f of the optical imaging system is 2.61 mm, and an axial distance TTL from the object-side surface S1 of the first lens L1 to the imaging plane S13 is 4.16 mm.

Table 5 is a table illustrating basic parameters of the optical imaging system of example 3, wherein the units of the radius of curvature, the thickness/distance and the focal length are millimeter (mm). Table 6 shows high-order coefficients applicable to each aspheric surface in example 3, wherein the surface type of each aspheric surface may be defined by the formula (1) given in the above example 1.

Figure 7:
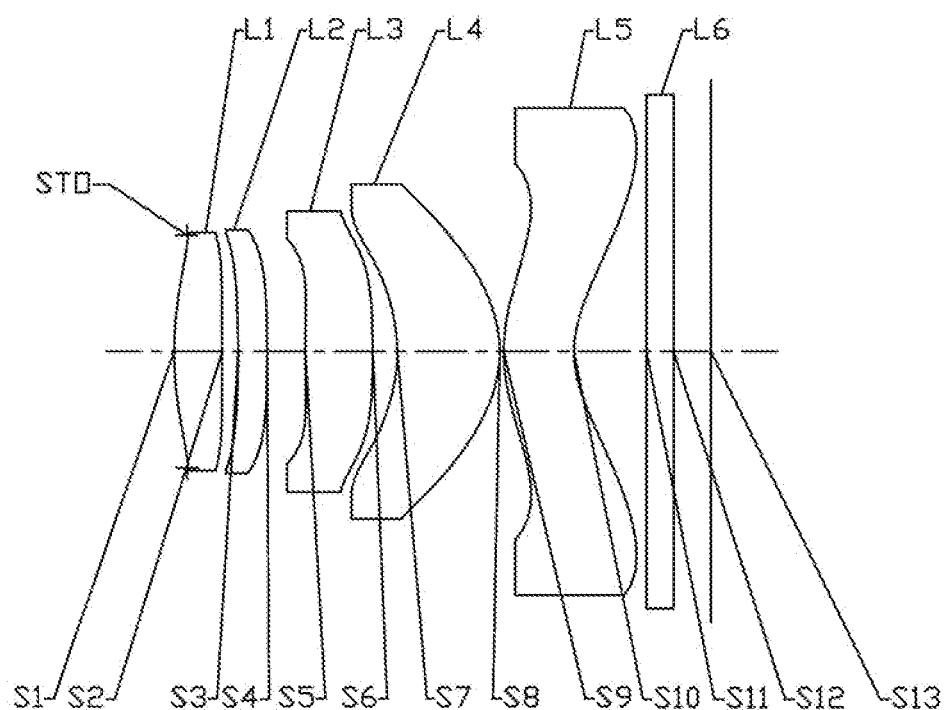
FIG. 7 illustrates a schematic structural diagram of an optical imaging system according to example 4 of the present disclosure.
Figure 8A:
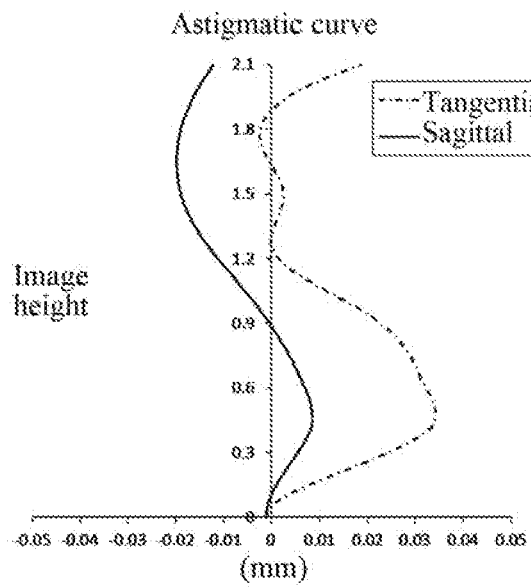
FIGS. 8A to 8C illustrate astigmatic curves, a distortion curve, and a relative illumination curve of the optical imaging system of the example 4, respectively.
Figure 8B:
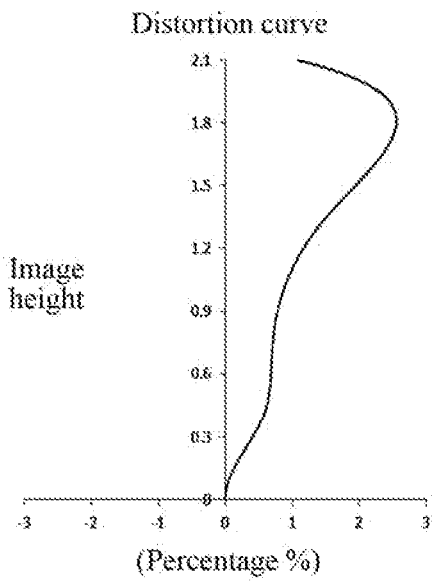
Figure 8C:
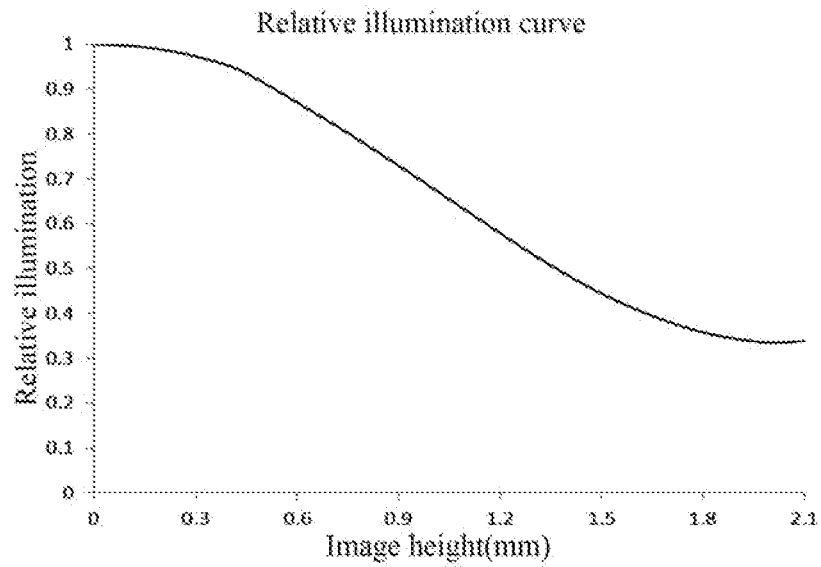

7 to FIG. 8C. FIG. 7 shows a schematic structural diagram of the optical imaging system according to example 4 of the present disclosure.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.2700 | | | | |
| S1 | Aspheric | 1.6796 | 0.5025 | 1.62 | 23.5 | 4.25 | −1.0924 |
| S2 | Aspheric | 4.1298 | 0.2842 | | | | −62.0948 |
| S3 | Aspheric | −10.5947 | 0.2200 | 1.63 | 20.4 | 36.54 | 95.3727 |
| S4 | Aspheric | −7.3265 | 0.2302 | | | | 42.8066 |
| S5 | Aspheric | 73.6864 | 0.3777 | 1.63 | 20.4 | −300.23 | −99.0000 |
| S6 | Aspheric | 53.0024 | 0.2385 | | | | −99.0000 |
| S7 | Aspheric | −1.6546 | 0.6915 | 1.62 | 23.5 | 2.62 | 0.2796 |
| S8 | Aspheric | −0.9478 | 0.0300 | | | | −1.7430 |
| S9 | Aspheric | 1.4940 | 0.5131 | 1.62 | 23.5 | −4.53 | −0.6192 |
| S10 | Aspheric | 0.8459 | 0.6363 | | | | −3.5760 |
| S11 | Spherical | Infinite | 0.2100 | 1.52 | 64.2 | | |
| S12 | Spherical | Infinite | 0.2218 | | | | |
| S13 | Spherical | Infinite | | | | | |

TABLE 6

| Surface number | A4 | A6 | A8 | A10 | A12 |
|---|---|---|---|---|---|
| S1 | 4.6093E−02 | −3.5419E−01 | 2.7798E+00 | −1.2273E+01 | 3.2231E+01 |
| S2 | 3.1317E−02 | 4.1884E−01 | −3.9624E+00 | 1.5848E+01 | −3.7915E+01 |
| S3 | −9.4165E−02 | 4.7996E−01 | −3.5372E+00 | 1.3487E+01 | −3.0709E+01 |
| S4 | −3.7674E−02 | −2.8190E−01 | 1.0834E+00 | −2.3241E+00 | 2.1304E+00 |
| S5 | −2.6254E−01 | 7.8284E−01 | −5.8167E+00 | 2.0991E+01 | −4.6874E+01 |
| S6 | −1.5646E−01 | 4.0423E−01 | −1.8217E+00 | 4.0887E+00 | −5.2753E+00 |
| S7 | 4.9181E−02 | 3.7281E−01 | −2.6160E+00 | 8.4178E+00 | −1.5766E+01 |
| S8 | 3.1757E−02 | −1.4795E−01 | −1.1409E−01 | 9.0013E−01 | −1.7498E+00 |
| S9 | −1.7593E−01 | −1.9445E−02 | 1.7443E−01 | −2.3495E−01 | 1.7604E−01 |
| S10 | −7.2011E−02 | 5.0193E−02 | −2.8958E−02 | 8.545E−03 | 3.4313E−04 |

| Surface number | A14 | A16 | A18 | A20 |
|---|---|---|---|---|
| S1 | −5.1857E+01 | 4.9969E+01 | −2.6485E+01 | 5.9290E+00 |
| S2 | 5.5455E+01 | −4.8689E+01 | 2.3594E+01 | −4.8455E+00 |
| S3 | 4.2412E+01 | −3.4334E+01 | 1.4964E+01 | −2.7176E+00 |
| S4 | 3.9024E−01 | −1.9988E+00 | 1.1038E+00 | −1.4483E−01 |
| S5 | 6.4397E+01 | −5.3592E+01 | 2.5185E+01 | −5.1504E+00 |
| S6 | 3.3384E+00 | −1.5279E−01 | −8.4598E−01 | 2.8896E−01 |
| S7 | 1.7873E+01 | −1.1879E+01 | 4.2470E+00 | −6.3130E−01 |
| S8 | 1.8266E+00 | −1.0823E+00 | 3.4403E−01 | −4.5953E−02 |
| S9 | −8.0747E−02 | 2.2412E−02 | −3.4516E−03 | 2.2602E−04 |
| S10 | −1.0539E−03 | 2.9278E−04 | −3.0322E−05 | 7.5774E−07 |

Figure 6A:
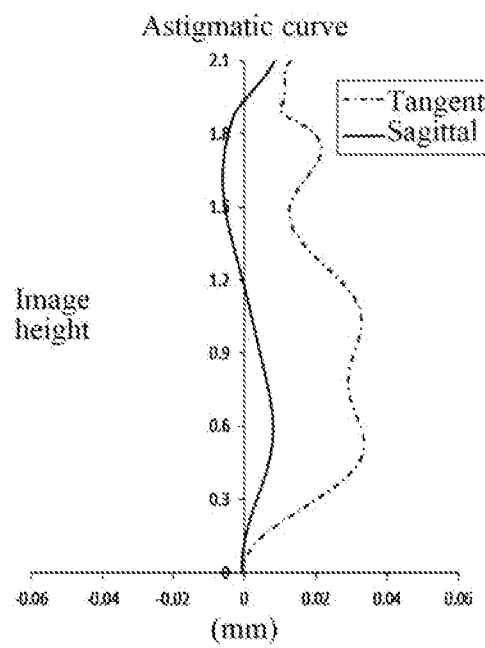
FIGS. 6A to 6C illustrate astigmatic curves, a distortion curve, and a relative illumination curve of the optical imaging system of the example 3, respectively.
Figure 6B:
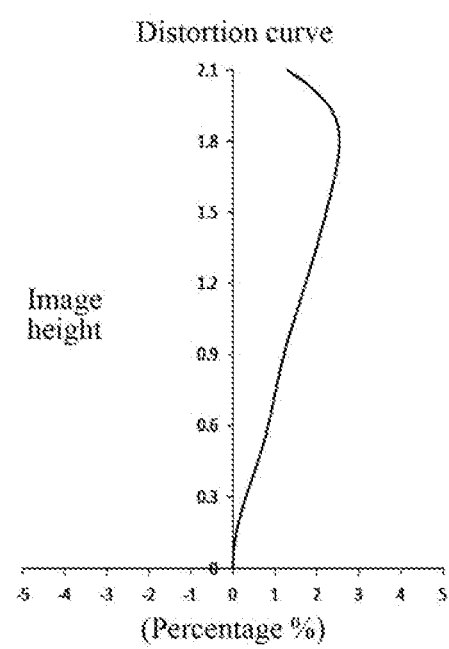
Figure 6C:
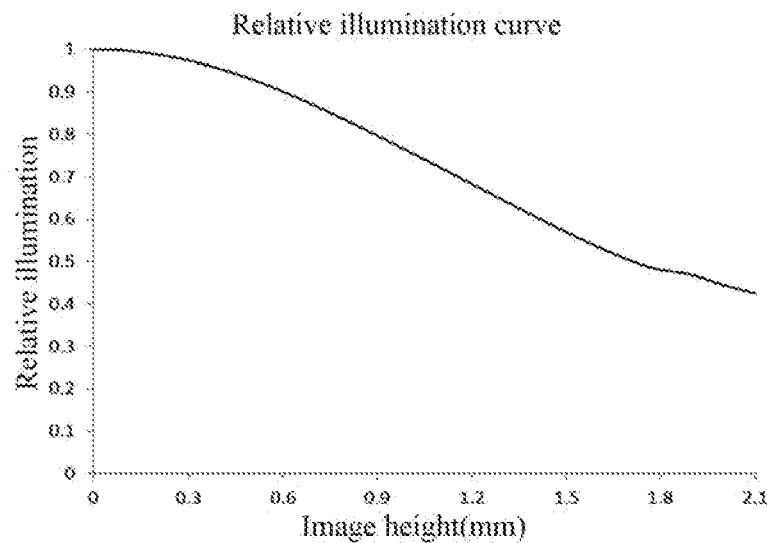

FIG. 6A illustrates astigmatic curves of the optical imaging system according to example 3, representing the curvatures of a tangential plane and the curvatures of a sagittal plane. FIG. 6B illustrates a distortion curve of the optical imaging system according to example 3, representing the amounts of distortion corresponding to different image heights. FIG. 6C illustrates a relative illumination curve of the optical imaging system according to example 3, representing the relative illumination corresponding to different image heights on the imaging plane. It can be seen from FIG. 6A to FIG. 6C that the optical imaging system provided in example 3 may achieve a good image quality.

Example 4

An optical imaging system according to example 4 of the present disclosure is described below with reference to FIG.

As shown in FIG. 7, the optical imaging system includes a stop STO, a first lens L1, a second lens L2, a third lens L3, a fourth lens L4, a fifth lens L5 and an optical filter L6, which are sequentially arranged from an object side to an image side along an optical axis.

The first lens L1 has a positive refractive power, an object-side surface S1 thereof is convex, and an image-side surface S2 thereof is convex. The second lens L2 has a negative refractive power, an object-side surface S3 thereof is concave, and an image-side surface S4 thereof is convex. The third lens L3 has a positive refractive power, an object-side surface S5 thereof is convex, and an image-side surface S6 thereof is convex. The fourth lens L4 has a positive refractive power, an object-side surface S7 thereof is concave, and an image-side surface S8 thereof is convex. The fifth lens L5 has a negative refractive power, an object-side surface S9 thereof is convex, and an image-side surface S10 thereof is concave. The optical filter L6 has an object-side surface S11 and an image-side surface S12. The optical imaging system has an imaging plane S13, light from an object sequentially passes through the respective surfaces S1 to S12 and is finally imaged on the imaging plane S13.

In example 4, a total effective focal length f of the optical imaging system is 2.33 mm, and an axial distance TTL from the object-side surface S1 of the first lens L1 to the imaging plane S13 is 4.18 mm.

Table 7 is a table illustrating basic parameters of the optical imaging system of example 4, wherein the units of the radius of curvature, the thickness/distance and the focal length are millimeter (mm). Table 8 shows high-order coefficients applicable to each aspheric surface in example 4, wherein the surface type of each aspheric surface may be defined by the formula (1) given in the above example 1.

tures of a tangential plane and the curvatures of a sagittal plane. FIG. 8B illustrates a distortion curve of the optical imaging system according to example 4, representing the amounts of distortion corresponding to different image heights. FIG. 8C illustrates a relative illumination curve of the optical imaging system according to example 4, representing the relative illumination corresponding to different image heights on the imaging plane. It can be seen from FIG. 8A to FIG. 8C that the optical imaging system provided in example 4 may achieve a good image quality.

Example 5

Figure 9:
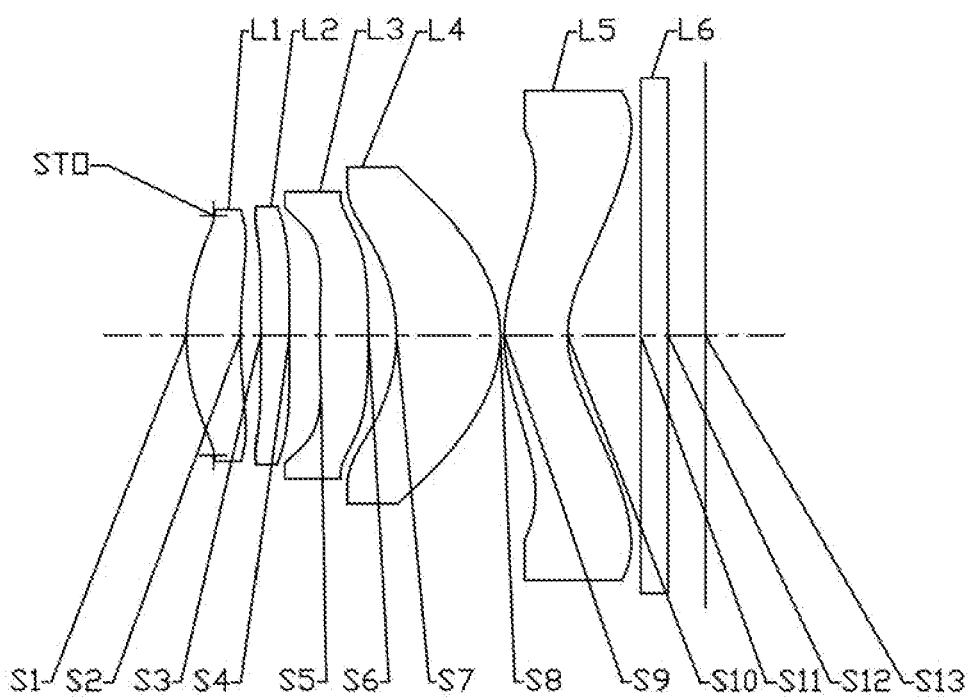
FIG. 9 illustrates a schematic structural diagram of an optical imaging system according to example 5 of the present disclosure.

An optical imaging system according to example 5 of the present disclosure is described below with reference to FIG. 9 to FIG. 10C. FIG. 9 shows a schematic structural diagram of the optical imaging system according to example 5 of the present disclosure.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.1000 | | | | |
| S1 | Aspheric | 2.7678 | 0.3761 | 1.62 | 23.5 | 4.46 | −7.9973 |
| S2 | Aspheric | −498.0000 | 0.1244 | | | | 99.0000 |
| S3 | Aspheric | −9.1827 | 0.2200 | 1.63 | 20.4 | −27.97 | 87.6111 |
| S4 | Aspheric | −19.2397 | 0.2994 | | | | 99.0000 |
| S5 | Aspheric | 7.8622 | 0.5263 | 1.63 | 20.4 | 5.94 | −20.2222 |
| S6 | Aspheric | −7.0311 | 0.1908 | | | | −8.9180 |
| S7 | Aspheric | −1.3048 | 0.8000 | 1.62 | 23.5 | 3.12 | 0.0151 |
| S8 | Aspheric | −0.9593 | 0.0300 | | | | −1.7557 |
| S9 | Aspheric | 1.3726 | 0.5481 | 1.62 | 23.5 | −5.26 | −0.9435 |
| S10 | Aspheric | 0.8175 | 0.5673 | | | | −3.2431 |
| S11 | Spherical | Infinite | 0.2100 | 1.52 | 64.2 | | |
| S12 | Spherical | Infinite | 0.2921 | | | | |
| S13 | Spherical | Infinite | | | | | |

TABLE 8

| Surface number | A4 | A6 | A8 | A10 | A12 |
|---|---|---|---|---|---|
| S1 | 6.6593E−02 | −7.4332E−01 | 5.7552E+00 | −2.7691E+01 | 8.1290E+01 |
| S2 | −6.2022E−02 | 5.2281E−01 | −4.4474E+00 | 2.0717E+01 | −5.9686E+01 |
| S3 | −4.1646E−02 | 2.1431E−01 | −1.1894E+00 | 4.1481E+00 | −1.0135E+01 |
| S4 | −8.9171E−02 | −4.4849E−01 | 3.2634E+00 | −1.3944E+01 | 3.6181E+01 |
| S5 | −2.4663E−01 | 4.7787E−01 | −4.0558E+00 | 1.6749E+01 | −4.5057E+01 |
| S6 | −1.0805E−01 | −1.5675E−01 | 4.4364E+00 | −2.0422E+00 | 4.8753E+00 |
| S7 | 1.9817E−01 | −4.3558E−01 | 1.1819E+00 | −3.1520E+00 | 5.5369E+00 |
| S8 | 3.3678E−03 | −3.6689E−02 | −1.3527E−01 | 4.2789E−01 | −6.1919E−01 |
| S9 | −2.1519E−01 | 1.7110E−01 | −3.9064E−01 | 6.8089E−01 | −7.5794E−01 |
| S10 | −7.6872E−02 | 4.5844E−02 | −2.8616E−02 | 8.6360E−03 | 3.4213E−04 |

| Surface number | A14 | A16 | A18 | A20 |
|---|---|---|---|---|
| S1 | −1.4770E+02 | 1.6172E+02 | −9.7735E+01 | 2.5026E+01 |
| S2 | 1.0726E+02 | −1.1748E+02 | 7.1768E+01 | −1.8699E+01 |
| S3 | 1.7337E+01 | −2.0493E+01 | 1.4819E+01 | −4.7254E+00 |
| S4 | −5.8531E+01 | 5.7130E+01 | −3.0577E+01 | 6.8487E+00 |
| S5 | 7.7991E+01 | −8.4629E+01 | 5.2602E+01 | −1.4242E+01 |
| S6 | −6.4150E+00 | 5.0964E+00 | −2.2677E+00 | 4.2491E−01 |
| S7 | −5.3899E+00 | 2.9706E+00 | −8.9687E−01 | 1.1902E−01 |
| S8 | 5.5572E−01 | −3.0935E−01 | 9.5585E−02 | −1.2201E−02 |
| S9 | 5.2325E−01 | −2.1833E−01 | 5.0575E−02 | −5.0023E−03 |
| S10 | −1.0574E−03 | 2.9205E−04 | −3.0420E−05 | 7.4825E−07 |

FIG. 8A illustrates astigmatic curves of the optical imaging system according to example 4, representing the curva- As shown in FIG. 9, the optical imaging system includes a stop STO, a first lens L1, a second lens L2, a third lens L3, a fourth lens L4, a fifth lens L5 and an optical filter L6, which are sequentially arranged from an object side to an image side along an optical axis.

The first lens L1 has a positive refractive power, an object-side surface S1 thereof is convex, and an image-side surface S2 thereof is concave. The second lens L2 has a negative refractive power, an object-side surface S3 thereof is convex, and an image-side surface S4 thereof is concave. The third lens L3 has a positive refractive power, an object-side surface S5 thereof is convex, and an image-side surface S6 thereof is convex. The fourth lens L4 has a positive refractive power, an object-side surface S7 thereof is concave, and an image-side surface S8 thereof is convex. The fifth lens L5 has a negative refractive power, an object-side surface S9 thereof is convex, and an image-side surface S10 thereof is concave. The optical filter L6 has an object-side surface S11 and an image-side surface S12. The optical imaging system has an imaging plane S13, light from an object sequentially passes through the respective surfaces S1 to S12 and is finally imaged on the imaging plane S13.

In example 5, a total effective focal length f of the optical imaging system is 2.35 mm, and an axial distance TTL from the object-side surface S1 of the first lens L1 to the imaging plane S13 is 3.99 mm.

Table 9 is a table illustrating basic parameters of the optical imaging system of example 5, wherein the units of the radius of curvature, the thickness/distance and the focal length are millimeter (mm). Table 10 shows high-order coefficients applicable to each aspheric surface in example 5, wherein the surface type of each aspheric surface may be defined by the formula (1) given in the above example 1.

TABLE 9

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.2100 | | | | |
| S1 | Aspheric | 1.8049 | 0.4166 | 1.62 | 23.5 | 4.73 | −1.5686 |
| S2 | Aspheric | 4.3100 | 0.1520 | | | | −83.3021 |
| S3 | Aspheric | 300.0000 | 0.2200 | 1.63 | 20.4 | −86.76 | −99.0000 |
| S4 | Aspheric | 46.4349 | 0.2344 | | | | −99.0000 |
| S5 | Aspheric | 6.5764 | 0.3749 | 1.63 | 20.4 | 5.75 | −87.1000 |
| S6 | Aspheric | −7.9722 | 0.2159 | | | | −21.4142 |
| S7 | Aspheric | −1.2939 | 0.8000 | 1.62 | 23.5 | 3.13 | 0.0235 |
| S8 | Aspheric | −0.9573 | 0.0300 | | | | −1.7035 |
| S9 | Aspheric | 1.3411 | 0.4875 | 1.62 | 23.5 | −5.45 | −0.7371 |
| S10 | Aspheric | 0.8257 | 0.5638 | | | | −3.3096 |
| S11 | Spherical | Infinite | 0.2100 | 1.52 | 64.2 | | |
| S12 | Spherical | Infinite | 0.2873 | | | | |
| S13 | Spherical | Infinite | | | | | |

TABLE 10

| Surface number | A4 | A6 | A8 | A10 | A12 |
|---|---|---|---|---|---|
| S1 | 6.9851E−02 | −7.0479E−01 | 5.7686E+00 | −2.7470E+01 | 7.9015E+01 |
| S2 | 3.7716E−02 | 5.0394E−01 | −5.0649E+00 | 2.1123E+01 | −5.1587E+01 |
| S3 | −1.2362E−01 | 7.9240E−01 | −5.9320E+00 | 2.5578E+01 | −6.6270E+01 |
| S4 | −5.5454E−02 | −8.3256E−01 | 5.9608E+00 | −2.3680E+01 | 5.7470E+01 |
| S5 | −2.2886E−01 | 9.3304E−01 | −8.0095E+00 | 3.2577E+01 | −8.1555E+01 |
| S6 | −1.2989E−01 | 4.0960E−01 | −3.4247E+00 | 1.1639E+01 | −2.4001E+01 |
| S7 | 1.9227E−01 | −3.0555E−01 | −1.4794E−01 | 2.1951E+00 | −6.1837E+00 |
| S8 | 7.3110E−02 | −3.9518E−01 | 8.7593E−01 | −1.3922E+00 | 1.4837E+00 |
| S9 | −2.0159E−01 | −2.7562E−02 | 2.0459E−01 | −2.9431E−01 | 2.3511E−01 |
| S10 | −7.9671E−02 | 4.9427E−02 | −2.9175E−02 | 8.5525E−03 | 3.4531E−04 |

| Surface number | A14 | A16 | A18 | A20 |
|---|---|---|---|---|
| S1 | −1.4017E+02 | 1.4942E+02 | −8.7733E+01 | 2.1779E+01 |
| S2 | 7.5244E+01 | −6.4472E+01 | 2.9909E+01 | −5.7657E+00 |
| S3 | 1.0354E+02 | −9.5116E+01 | 4.7314E+01 | −9.8188E+00 |
| S4 | −8.7820E+01 | 8.3109E+01 | −4.4712E+01 | 1.0459E+01 |
| S5 | 1.2632E+02 | −1.1843E+02 | 6.1718E+01 | −1.3653E+01 |
| S6 | 3.0829E+01 | −2.3558E+01 | 9.8144E+00 | −1.7237E+00 |
| S7 | 9.9330E+00 | −8.9361E+00 | 4.1665E+00 | −7.8627E−01 |
| S8 | −9.9229E−01 | 3.9087E−01 | −8.1132E−02 | 6.7247E−03 |
| S9 | −1.1527E−01 | 3.4234E−02 | −5.6078E−03 | 3.8490E−04 |
| S10 | −1.0553E−03 | 2.9250E−04 | −3.0323E−05 | 7.5544E−07 |

Figures 10A, 10B:
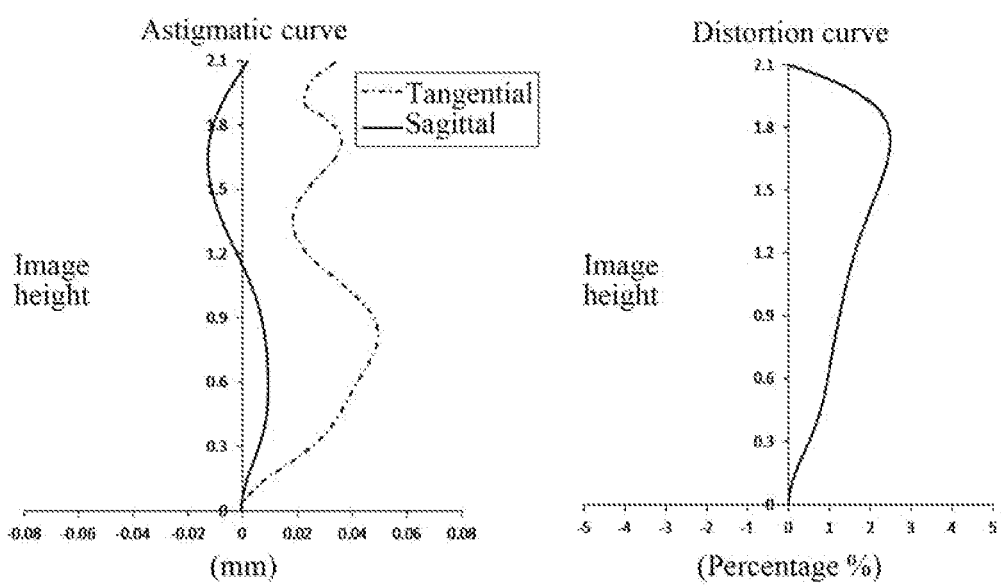
FIGS. 10A to 10C illustrate astigmatic curves, a distortion curve, and a relative illumination curve of the optical imaging system of the example 5, respectively.
Figure 10C:
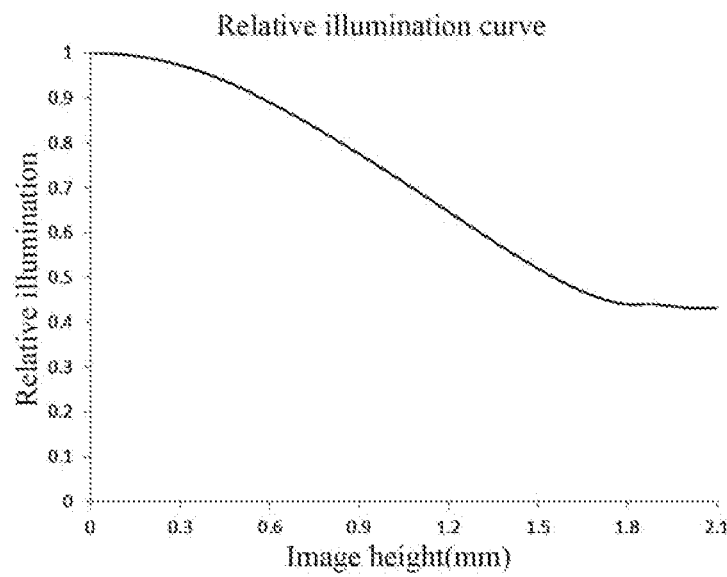

FIG. 10A illustrates astigmatic curves of the optical imaging system according to example 5, representing the curvatures of a tangential plane and the curvatures of a sagittal plane. FIG. 10B illustrates a distortion curve of the optical imaging system according to example 5, representing the amounts of distortion corresponding to different image heights. FIG. 10C illustrates a relative illumination curve of the optical imaging system according to example 5, representing the relative illumination corresponding to different image heights on the imaging plane. It can be seen from FIG. 10A to FIG. 10C that the optical imaging system provided in example 5 may achieve a good image quality.

Example 6

Figure 11:
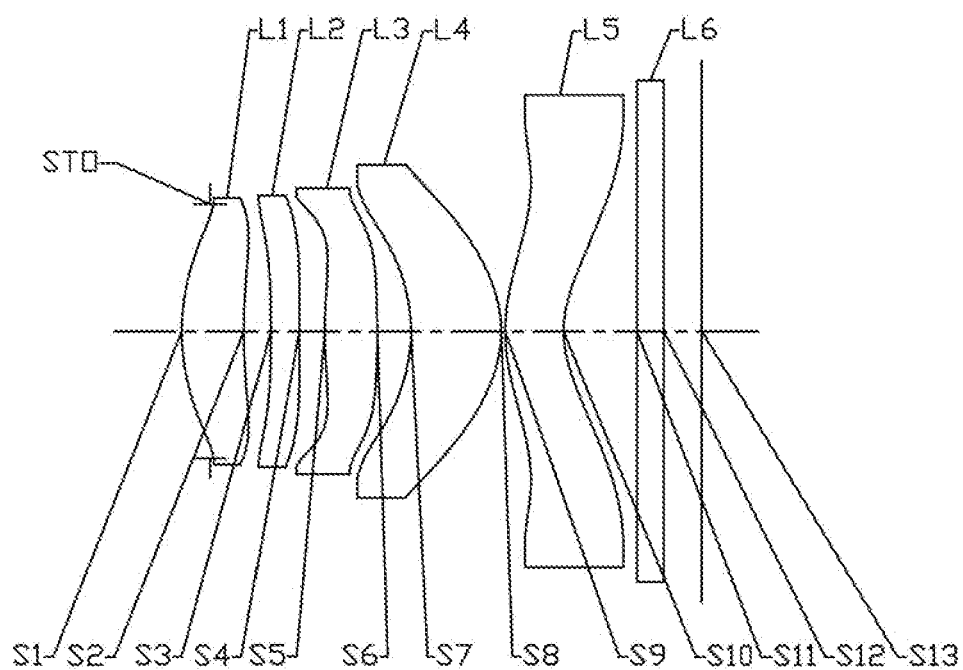
FIG. 11 illustrates a schematic structural diagram of an optical imaging system according to example 6 of the present disclosure.

An optical imaging system according to example 6 of the present disclosure is described below with reference to FIG. 11 to FIG. 12C. FIG. 11 shows a schematic structural diagram of the optical imaging system according to example 6 of the present disclosure.

As shown in FIG. 11, the optical imaging system includes a stop STO, a first lens L1, a second lens L2, a third lens L3, a fourth lens L4, a fifth lens L5 and an optical filter L6, which are sequentially arranged from an object side to an image side along an optical axis.

The first lens L1 has a positive refractive power, an object-side surface S1 thereof is convex, and an image-side surface S2 thereof is concave. The second lens L2 has a negative refractive power, an object-side surface S3 thereof is concave, and an image-side surface S4 thereof is concave. The third lens L3 has a positive refractive power, an object-side surface S5 thereof is convex, and an image-side surface S6 thereof is convex. The fourth lens L4 has a positive refractive power, an object-side surface S7 thereof is concave, and an image-side surface S8 thereof is convex. The fifth lens L5 has a negative refractive power, an object-side surface S9 thereof is convex, and an image-side surface S10 thereof is concave. The optical filter L6 has an object-side surface S11 and an image-side surface S12. The optical imaging system has an imaging plane S13, light from an object sequentially passes through the respective surfaces S1 to S12 and is finally imaged on the imaging plane S13.

In example 6, a total effective focal length f of the optical imaging system is 2.50 mm, and an axial distance TTL from the object-side surface S1 of the first lens L1 to the imaging plane S13 is 4.04 mm.

Table 11 is a table illustrating basic parameters of the optical imaging system of example 6, wherein the units of the radius of curvature, the thickness/distance and the focal length are millimeter (mm). Table 12 shows high-order coefficients applicable to each aspheric surface in example 6, wherein the surface type of each aspheric surface may be defined by the formula (1) given in the above example 1.

TABLE 11

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.2200 | | | | |
| S1 | Aspheric | 1.7606 | 0.4822 | 1.62 | 23.5 | 4.32 | −1.4564 |
| S2 | Aspheric | 4.6456 | 0.2067 | | | | −90.6045 |
| S3 | Aspheric | −10.4572 | 0.2200 | 1.63 | 20.4 | −11.31 | 95.0411 |
| S4 | Aspheric | 22.9359 | 0.1984 | | | | −71.4155 |
| S5 | Aspheric | 3.6606 | 0.4076 | 1.63 | 20.4 | 4.25 | −7.9634 |
| S6 | Aspheric | −9.7689 | 0.2628 | | | | −28.0148 |
| S7 | Aspheric | −1.2794 | 0.7017 | 1.62 | 23.5 | 3.25 | 0.0346 |
| S8 | Aspheric | −0.9449 | 0.0300 | | | | −1.8467 |
| S9 | Aspheric | 1.3912 | 0.4533 | 1.62 | 23.5 | −4.60 | −0.6675 |
| S10 | Aspheric | 0.8178 | 0.5712 | | | | −3.4772 |
| S11 | Spherical | Infinite | 0.2100 | 1.52 | 64.2 | | |
| S12 | Spherical | Infinite | 0.2946 | | | | |
| S13 | Spherical | Infinite | | | | | |

TABLE 12

| Surface number | A4 | A6 | A8 | A10 | A12 |
|---|---|---|---|---|---|
| S1 | 4.1061E−02 | −2.5621E−01 | 2.0239E+00 | −9.2190E+00 | 2.4631E+01 |
| S2 | 3.4697E−02 | 3.7156E−01 | −3.6748E+00 | 1.4138E+01 | −3.2089E+01 |
| S3 | −9.1559E−02 | 5.7087E−01 | −3.9621E+00 | 1.5382E+01 | −3.6080E+01 |
| S4 | −9.1800E−02 | −2.5479E−01 | 1.1683E+00 | −2.5535E+00 | 2.3456E+00 |
| S5 | −2.1010E−01 | 7.2648E−01 | −5.1208E+00 | 1.7308E+01 | −3.6495E+01 |
| S6 | −9.6868E−02 | 4.3989E−02 | −2.8715E−01 | −8.7429E−01 | 4.6909E+00 |
| S7 | 1.8734E−01 | −6.0262E−01 | 1.7435E+00 | −3.6337E+00 | 4.9597E+00 |
| S8 | 9.5921E−02 | −5.9518E−01 | 1.6396E+00 | −3.1203E+00 | 3.9182E+00 |
| S9 | −2.3376E−01 | −3.6319E−03 | 2.0139E−01 | −3.1532E−01 | 2.6587E−01 |
| S10 | −9.1279E−02 | 5.5566E−02 | −3.0332E−02 | 8.4819E−03 | 3.7151E−04 |

| Surface number | A14 | A16 | A18 | A20 |
|---|---|---|---|---|
| S1 | −3.9996E+01 | 3.8618E+01 | −2.0412E+01 | 4.5424E+00 |
| S2 | 4.4005E+01 | −3.5894E+01 | 1.6097E+01 | −3.0656E+00 |
| S3 | 5.1473E+01 | −4.3229E+01 | 1.9637E+01 | −3.7242E+00 |
| S4 | 3.3636E−01 | −2.0111E+00 | 1.0673E+00 | −1.1254E−01 |
| S5 | 4.7308E+01 | −3.6874E+01 | 1.6054E+01 | −3.0034E+00 |
| S6 | −9.1605E+00 | 9.5739E+00 | −5.1298E+00 | 1.0976E+00 |

TABLE 12-continued

| | | | | |
|---|---|---|---|---|
| S7 | −3.9132E+00 | 1.7862E+00 | −4.7044E−01 | 6.1436E−02 |
| S8 | −3.1119E+00 | 1.4979E+00 | −3.9840E−01 | 4.4999E−02 |
| S9 | −1.3716E−01 | 4.3294E−02 | −7.6447E−03 | 5.7547E−04 |
| S10 | −1.0438E−03 | 2.9525E−04 | −3.0123E−05 | 5.4678E−07 |

Figure 12A:
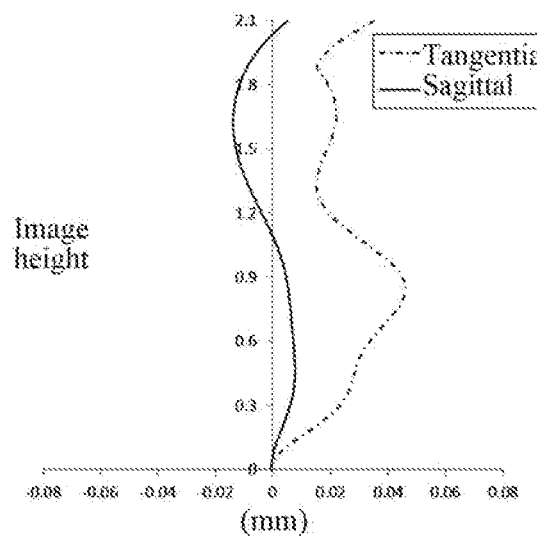
FIGS. 12A to 12C illustrate astigmatic curves, a distortion curve, and a relative illumination curve of the optical imaging system of the example 6, respectively.
Figure 12B:
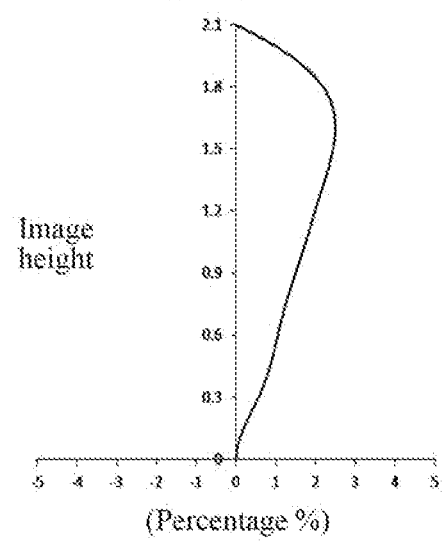
Figure 12C:
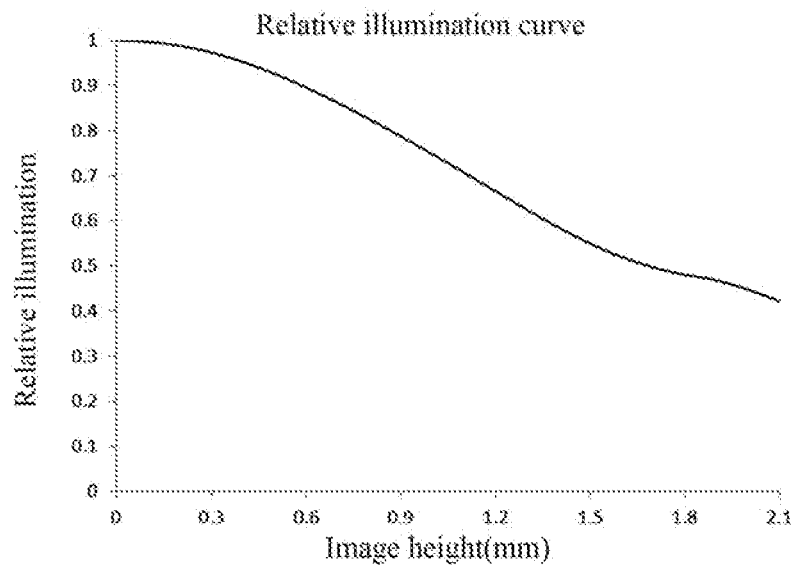

FIG. 12A illustrates astigmatic curves of the optical imaging system according to example 6, representing the curvatures of a tangential plane and the curvatures of a sagittal plane. FIG. 12B illustrates a distortion curve of the optical imaging system according to example 6, representing the amounts of distortion corresponding to different image heights. FIG. 12C illustrates a relative illumination curve of the optical imaging system according to example 6, representing the relative illumination corresponding to different image heights on the imaging plane. It can be seen from FIG. 12A to FIG. 12C that the optical imaging system provided in example 6 may achieve a good image quality.

Example 7

Figure 13:
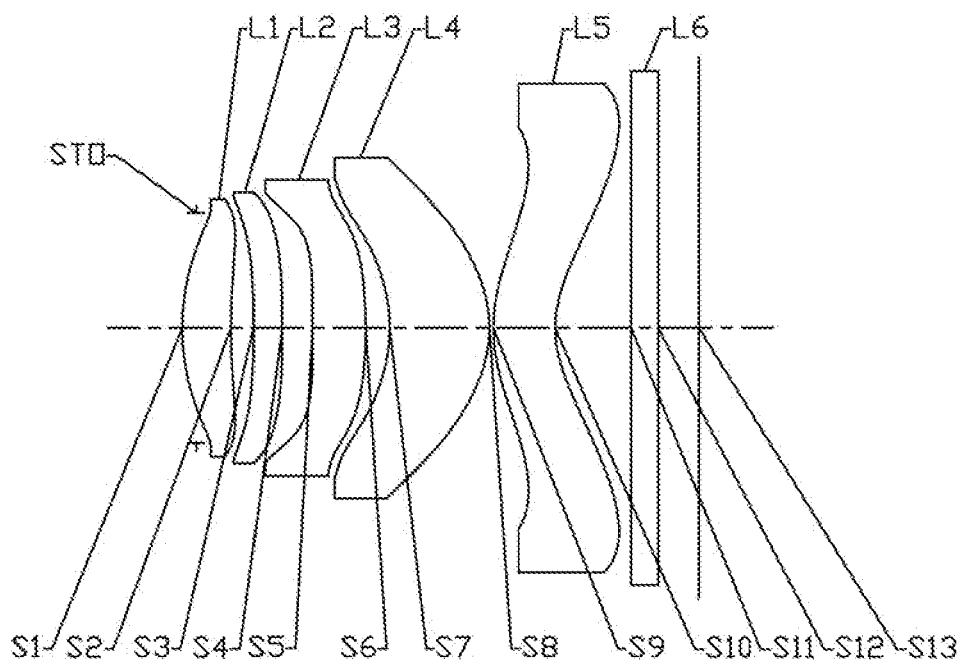
FIG. 13 illustrates a schematic structural diagram of an optical imaging system according to example 7 of the present disclosure.

An optical imaging system according to example 7 of the present disclosure is described below with reference to FIG. 13 to FIG. 14C. FIG. 13 shows a schematic structural diagram of the optical imaging system according to example 7 of the present disclosure.

As shown in FIG. 13, the optical imaging system includes a stop STO, a first lens L1, a second lens L2, a third lens L3, a fourth lens L4, a fifth lens L5 and an optical filter L6, which are sequentially arranged from an object side to an image side along an optical axis.

The first lens L1 has a positive refractive power, an object-side surface S1 thereof is convex, and an image-side surface S2 thereof is concave. The second lens L2 has a negative refractive power, an object-side surface S3 thereof is concave, and an image-side surface S4 thereof is convex. The third lens L3 has a positive refractive power, an object-side surface S5 thereof is concave, and an image-side surface S6 thereof is convex. The fourth lens L4 has a positive refractive power, an object-side surface S7 thereof is concave, and an image-side surface S8 thereof is convex. The fifth lens L5 has a negative refractive power, an object-side surface S9 thereof is convex, and an image-side surface S10 thereof is concave. The optical filter L6 has an object-side surface S11 and an image-side surface S12. The optical imaging system has an imaging plane S13, light from an object sequentially passes through the respective surfaces S1 to S12 and is finally imaged on the imaging plane S13.

In example 7, a total effective focal length f of the optical imaging system is 2.34 mm, and an axial distance TTL from the object-side surface S1 of the first lens L1 to the imaging plane S13 is 4.01 mm.

Table 13 is a table illustrating basic parameters of the optical imaging system of example 7, wherein the units of the radius of curvature, the thickness/distance and the focal length are millimeter (mm). Table 14 shows high-order coefficients applicable to each aspheric surface in example 7, wherein the surface type of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.1100 | | | | |
| S1 | Aspheric | 1.8242 | 0.3789 | 1.62 | 23.5 | 4.39 | −1.2251 |
| S2 | Aspheric | 5.1288 | 0.1747 | | | | −99.0000 |
| S3 | Aspheric | −10.2074 | 0.2200 | 1.63 | 20.4 | −527.81 | 95.5261 |
| S4 | Aspheric | −10.6168 | 0.2338 | | | | 93.2218 |
| S5 | Aspheric | −460.0000 | 0.4134 | 1.63 | 20.4 | 6.58 | 99.0000 |
| S6 | Aspheric | −4.1317 | 0.1879 | | | | −4.8155 |
| S7 | Aspheric | −1.2665 | 0.7751 | 1.62 | 23.5 | 3.50 | 0.0178 |
| S8 | Aspheric | −0.9846 | 0.0300 | | | | −1.7165 |
| S9 | Aspheric | 1.2923 | 0.4795 | 1.62 | 23.5 | −6.86 | −0.8080 |
| S10 | Aspheric | 0.8499 | 0.5923 | | | | −2.8955 |
| S11 | Spherical | Infinite | 0.2100 | 1.52 | 64.2 | | |
| S12 | Spherical | Infinite | 0.3158 | | | | |
| S13 | Spherical | Infinite | | | | | |

TABLE 14

| Surface number | A4 | A6 | A8 | A10 | A12 |
|---|---|---|---|---|---|
| S1 | 6.3810E−02 | −5.0186E−01 | 3.5583E+00 | −1.4580E+01 | 3.6168E+01 |
| S2 | −1.4946E−02 | 7.4954E−01 | −6.0460E+00 | 2.4772E+01 | −6.2402E+01 |
| S3 | −1.1762E−01 | 4.7711E−01 | −3.1673E+00 | 1.1841E+01 | −2.7009E+01 |
| S4 | −5.0663E−02 | −3.2597E−01 | 1.3805E+00 | −3.1322E+00 | 3.2243E+00 |
| S5 | −2.2851E−01 | 7.6642E−01 | −5.4522E+00 | 1.8755E+01 | −4.0152E+01 |
| S6 | −1.5510E−01 | 4.4468E−01 | −2.4518E+00 | 6.5114E+00 | −1.0924E+01 |
| S7 | 1.0469E−01 | 2.6204E−01 | −2.2898E+00 | 7.4549E+00 | −1.4360E+01 |
| S8 | 5.0380E−02 | −3.1717E−01 | 7.2094E−01 | −1.2259E+00 | 1.4376E+00 |

TABLE 14-continued

| S9 | −1.7869E−01 | −1.3746E−02 | 7.2001E−02 | −4.1776E−02 | −2.0072E−02 |
| S10 | −8.7415E−02 | 4.9909E−02 | −2.8851E−02 | 8.5420E−03 | 3.2987E−04 |

| Surface number | A14 | A16 | A18 | A20 |
|---|---|---|---|---|
| S1 | −5.5496E+01 | 5.1257E+01 | −2.6133E+01 | 5.6023E+00 |
| S2 | 9.7506E+01 | −9.2512E+01 | 4.8816E+01 | −1.0977E+01 |
| S3 | 3.7582E+01 | −3.0880E+01 | 1.3819E+01 | −2.6132E+00 |
| S4 | −2.7714E−01 | −1.9131E+00 | 1.0957E+00 | −1.0438E−01 |
| S5 | 5.2860E+01 | −4.1921E+01 | 1.8621E+01 | −3.5669E+00 |
| S6 | 1.1610E+01 | −7.2558E+00 | 2.4170E+00 | −3.3342E−01 |
| S7 | 1.7630E+01 | −1.3058E+01 | 5.2637E+00 | −8.8508E−01 |
| S8 | −1.0797E+00 | 4.9284E−01 | −1.2428E−01 | 1.3290E−02 |
| S9 | 3.9738E−02 | −2.2380E−02 | 5.8335E−03 | −6.0026E−04 |
| S10 | −1.0571E−03 | 2.9255E−04 | −3.0379E−05 | 7.4919E−07 |

Figure 14A:
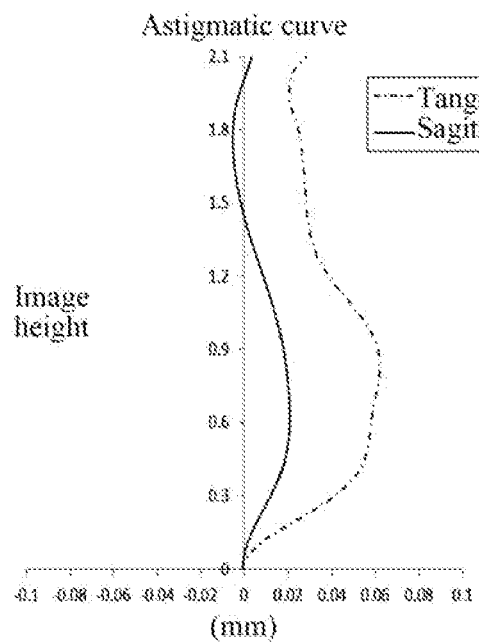
FIGS. 14A to 14C illustrate astigmatic curves, a distortion curve, and a relative illumination curve of the optical imaging system of the example 7, respectively.
Figure 14B:
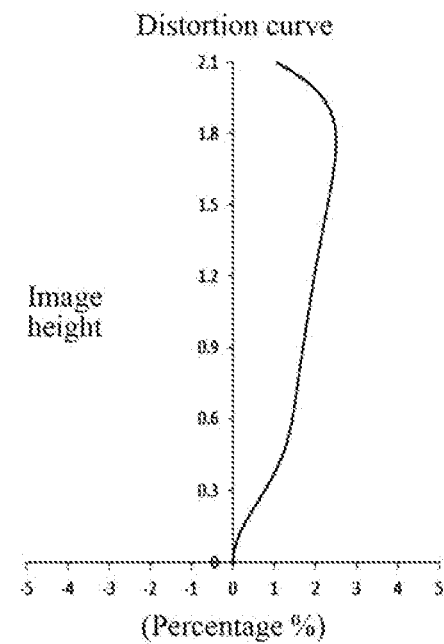
Figure 14C:
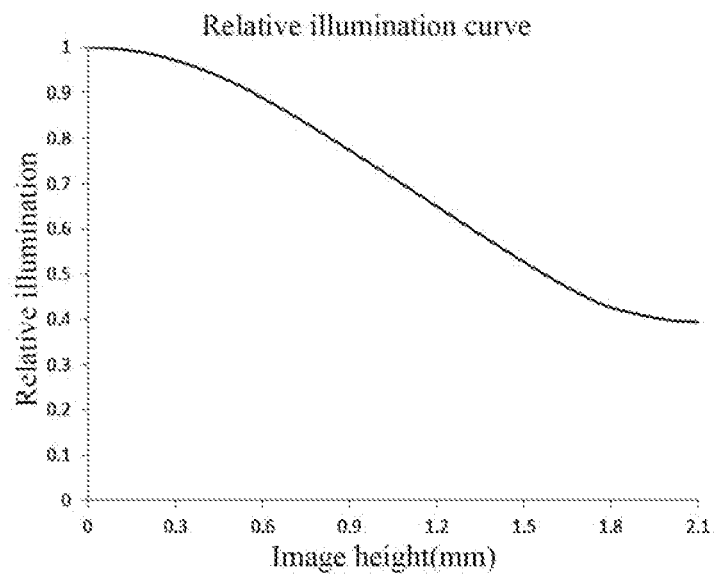

FIG. 14A illustrates astigmatic curves of the optical imaging system according to example 7, representing the curvatures of a tangential plane and the curvatures of a sagittal plane. FIG. 14B illustrates a distortion curve of the optical imaging system according to example 7, representing the amounts of distortion corresponding to different image heights. FIG. 14C illustrates a relative illumination curve of the optical imaging system according to example 7, representing the relative illumination corresponding to different image heights on the imaging plane. It can be seen from FIG. 14A to FIG. 14C that the optical imaging system provided in example 7 may achieve a good image quality.

Example 8

Figure 15:
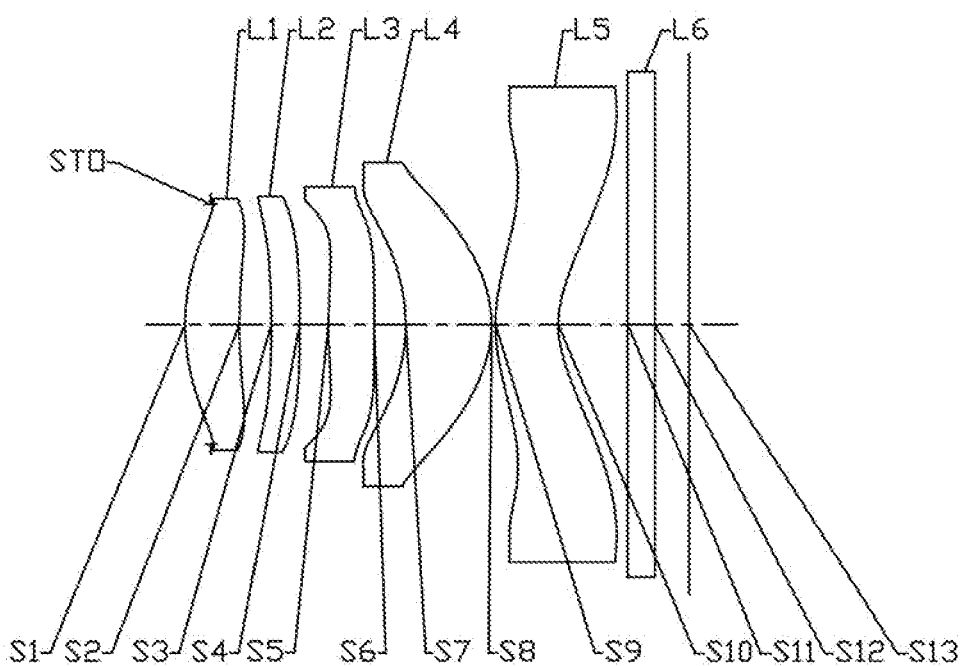
FIG. 15 illustrates a schematic structural diagram of an optical imaging system according to example 8 of the present disclosure.

An optical imaging system according to example 8 of the present disclosure is described below with reference to FIG. 15 to FIG. 16C. FIG. 15 shows a schematic structural diagram of the optical imaging system according to example 8 of the present disclosure.

As shown in FIG. 15, the optical imaging system includes a stop STO, a first lens L1, a second lens L2, a third lens L3, a fourth lens L4, a fifth lens L5 and an optical filter L6, which are sequentially arranged from an object side to an image side along an optical axis.

The first lens L1 has a positive refractive power, an object-side surface S1 thereof is convex, and an image-side surface S2 thereof is concave. The second lens L2 has a negative refractive power, an object-side surface S3 thereof is concave, and an image-side surface S4 thereof is convex. The third lens L3 has a positive refractive power, an object-side surface S5 thereof is convex, and an image-side surface S6 thereof is concave. The fourth lens L4 has a positive refractive power, an object-side surface S7 thereof is concave, and an image-side surface S8 thereof is convex. The fifth lens L5 has a negative refractive power, an object-side surface S9 thereof is convex, and an image-side surface S10 thereof is concave. The optical filter L6 has an object-side surface S11 and an image-side surface S12. The optical imaging system has an imaging plane S13, light from an object sequentially passes through the respective surfaces S1 to S12 and is finally imaged on the imaging plane S13.

In example 8, a total effective focal length f of the optical imaging system is 2.44 mm, and an axial distance TTL from the object-side surface S1 of the first lens L1 to the imaging plane S13 is 3.90 mm.

Table 15 is a table illustrating basic parameters of the optical imaging system of example 8, wherein the units of the radius of curvature, the thickness/distance and the focal length are millimeter (mm). Table 16 shows high-order coefficients applicable to each aspheric surface in example 8, wherein the surface type of each aspheric surface may be defined by the formula (1) given in the above example 1.

TABLE 15

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.2000 | | | | |
| S1 | Aspheric | 1.7128 | 0.4203 | 1.62 | 23.5 | 4.33 | −1.8560 |
| S2 | Aspheric | 4.3151 | 0.2421 | | | | −95.5881 |
| S3 | Aspheric | −10.5328 | 0.2200 | 1.63 | 20.4 | −32.40 | 92.6518 |
| S4 | Aspheric | −21.8161 | 0.2235 | | | | 99.0000 |
| S5 | Aspheric | 3.8150 | 0.3549 | 1.63 | 20.4 | 6.14 | −20.7715 |
| S6 | Aspheric | 186.6171 | 0.2448 | | | | 99.0000 |
| S7 | Aspheric | −1.3411 | 0.6649 | 1.62 | 23.5 | 3.05 | 0.0215 |
| S8 | Aspheric | −0.9309 | 0.0300 | | | | −1.8511 |
| S9 | Aspheric | 1.4358 | 0.4867 | 1.62 | 23.5 | −4.26 | −0.6412 |
| S10 | Aspheric | 0.8085 | 0.5397 | | | | −3.6464 |
| S11 | Spherical | Infinite | 0.2100 | 1.52 | 64.2 | | |
| S12 | Spherical | Infinite | 0.2631 | | | | |
| S13 | Spherical | Infinite | | | | | |

TABLE 16

| Surface number | A4 | A6 | A8 | A10 | A12 |
|---|---|---|---|---|---|
| S1 | 4.1807E−02 | −1.7420E−01 | 1.4739E+00 | −7.9201E+00 | 2.4550E+01 |
| S2 | 8.3557E−02 | −1.0861E−01 | −8.8599E−01 | 3.9136E+00 | −9.0083E+00 |
| S3 | −8.8237E−02 | 2.8567E−01 | −1.8629E+00 | 6.6710E+00 | −1.4156E+01 |
| S4 | −1.0270E−01 | −3.1769E−01 | 2.2082E+00 | −8.1708E+00 | 1.8599E+01 |
| S5 | −1.9392E−01 | 2.6257E−01 | −1.7946E+00 | 3.2506E+00 | −2.2397E−01 |
| S6 | −8.9316E−02 | −1.0940E−01 | 2.3223E−02 | −8.2737E−01 | 3.3257E+00 |
| S7 | 1.8882E−01 | −4.2578E−01 | 6.5587E−01 | −2.9415E−01 | −1.1617E+00 |
| S8 | 3.6555E−02 | −1.6761E−01 | −1.2263E−01 | 1.0845E+00 | −2.2584E+00 |
| S9 | −2.4852E−01 | 2.5324E−02 | 1.3625E−01 | −2.2415E−01 | 1.9181E−01 |
| S10 | −9.1897E−02 | 5.6253E−02 | −3.0310E−02 | 8.4717E−03 | 3.6420E−04 |

| Surface number | A14 | A16 | A18 | A20 |
|---|---|---|---|---|
| S1 | −4.6021E+01 | 5.0992E+01 | −3.0801E+01 | 7.8096E+00 |
| S2 | 1.1649E+01 | −8.4240E+00 | 3.1614E+00 | −4.7336E−01 |
| S3 | 1.7163E+01 | −1.0355E+01 | 1.9415E+00 | 3.6647E−01 |
| S4 | −2.7081E+01 | 2.5023E+01 | −1.3444E+01 | 3.1745E+00 |
| S5 | −1.0697E+01 | 1.8981E+01 | −1.3501E+01 | 3.6013E+00 |
| S6 | −6.4237E+00 | 7.0423E+00 | −3.9764E+00 | 8.8828E−01 |
| S7 | 3.1387E+00 | −3.1921E+00 | 1.4851E+00 | −2.6454E−01 |
| S8 | 2.5792E+00 | −1.7006E+00 | 6.0135E−01 | −8.7623E−02 |
| S9 | −1.0287E−01 | 3.4777E−02 | −6.6921E−03 | 5.5184E−04 |
| S10 | −1.0467E−03 | 2.9426E−04 | −3.0191E−05 | 6.7302E−07 |

Figures 16A, 16B:
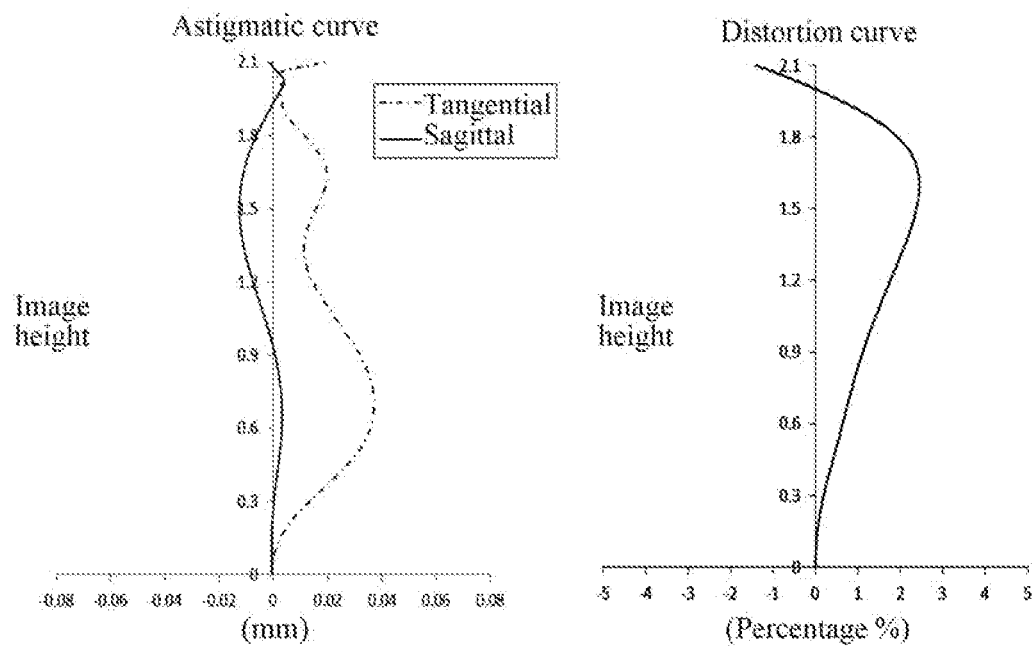
FIGS. 16A to 16C illustrate astigmatic curves, a distortion curve, and a relative illumination curve of the optical imaging system of the example 8, respectively.
Figure 16C:
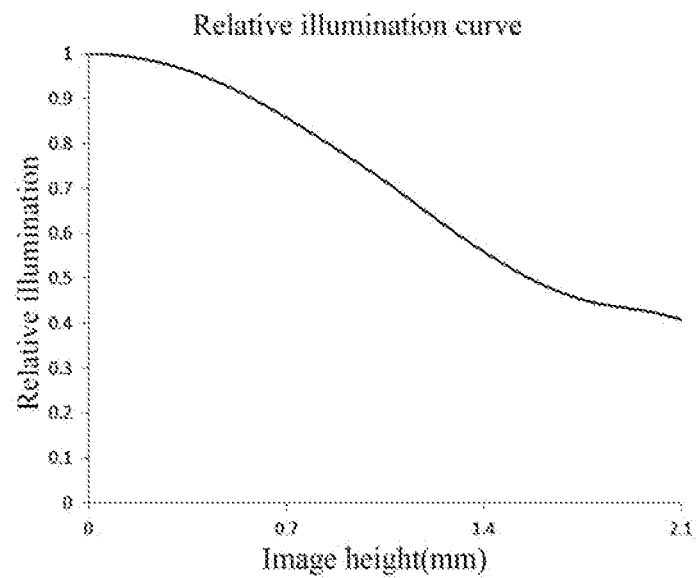

FIG. 16A illustrates astigmatic curves of the optical imaging system according to example 8, representing the curvatures of a tangential plane and the curvatures of a sagittal plane. FIG. 16B illustrates a distortion curve of the optical imaging system according to example 8, representing the amounts of distortion corresponding to different image heights. FIG. 16C illustrates a relative illumination curve of the optical imaging system according to example 8, representing the relative illumination corresponding to different image heights on the imaging plane. It can be seen from FIG. 16A to FIG. 16C that the optical imaging system provided in example 8 may achieve a good image quality.

Example 9

Figure 17:
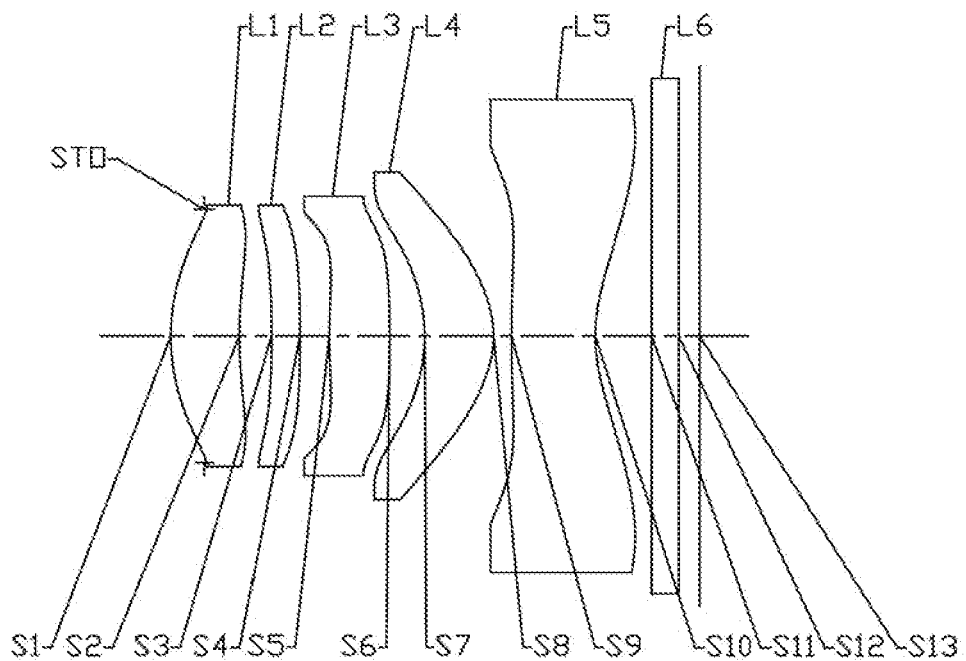
FIG. 17 illustrates a schematic structural diagram of an optical imaging system according to example 9 of the present disclosure.

An optical imaging system according to example 9 of the present disclosure is described below with reference to FIG. 17 to FIG. 18C. FIG. 17 shows a schematic structural diagram of the optical imaging system according to example 9 of the present disclosure.

As shown in FIG. 17, the optical imaging system includes a stop STO, a first lens L1, a second lens L2, a third lens L3, a fourth lens L4, a fifth lens L5 and an optical filter L6, which are sequentially arranged from an object side to an image side along an optical axis.

The first lens L1 has a positive refractive power, an object-side surface S1 thereof is convex, and an image-side surface S2 thereof is concave. The second lens L2 has a negative refractive power, an object-side surface S3 thereof is concave, and an image-side surface S4 thereof is convex. The third lens L3 has a positive refractive power, an object-side surface S5 thereof is convex, and an image-side surface S6 thereof is convex. The fourth lens L4 has a positive refractive power, an object-side surface S7 thereof is concave, and an image-side surface S8 thereof is convex. The fifth lens L5 has a negative refractive power, an object-side surface S9 thereof is concave, and an image-side surface S10 thereof is concave. The optical filter L6 has an object-side surface S11 and an image-side surface S12. The optical imaging system has an imaging plane S13, light from an object sequentially passes through the respective surfaces S1 to S12 and is finally imaged on the imaging plane S13.

In example 9, a total effective focal length f of the optical imaging system is 2.72 mm, and an axial distance TTL from the object-side surface S1 of the first lens L1 to the imaging plane S13 is 4.10 mm.

Table 17 is a table illustrating basic parameters of the optical imaging system of example 9, wherein the units of the radius of curvature, the thickness/distance and the focal length are millimeter (mm). Table 18 shows high-order coefficients applicable to each aspheric surface in example 9, wherein the surface type of each aspheric surface may be defined by the formula (1) given in the above example 1.

TABLE 17

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.2600 | | | | |
| S1 | Aspheric | 1.6438 | 0.5332 | 1.62 | 23.5 | 4.21 | −1.1939 |
| S2 | Aspheric | 3.9170 | 0.2445 | | | | −58.9220 |
| S3 | Aspheric | −10.3252 | 0.2200 | 1.63 | 20.4 | −32.41 | 94.2597 |
| S4 | Aspheric | −20.9459 | 0.2287 | | | | 88.3212 |
| S5 | Aspheric | 5.0509 | 0.4680 | 1.63 | 20.4 | 5.65 | −22.3665 |
| S6 | Aspheric | −11.8626 | 0.2724 | | | | 5.3073 |
| S7 | Aspheric | −1.3035 | 0.5360 | 1.62 | 23.5 | 2.27 | 0.0376 |

TABLE 17-continued

| Surface number | Surface type | Radius of curvature | Thickness/ Distance | Material Refractive index | Abbe number | Focal length | Conic coefficient |
|---|---|---|---|---|---|---|---|
| S8 | Aspheric | −0.7816 | 0.1387 | | | | −2.1663 |
| S9 | Aspheric | −469.0000 | 0.6500 | 1.62 | 23.5 | −2.05 | −99.0000 |
| S10 | Aspheric | 1.2713 | 0.4382 | | | | −4.5309 |
| S11 | Spherical | Infinite | 0.2100 | 1.52 | 64.2 | | |
| S12 | Spherical | Infinite | 0.1616 | | | | |
| S13 | Spherical | Infinite | | | | | |

TABLE 18

| Surface number | A4 | A6 | A8 | A10 | A12 |
|---|---|---|---|---|---|
| S1 | 3.3515E−02 | −1.3496E−01 | 1.0344E+00 | −4.6665E+00 | 1.2295E+01 |
| S2 | 6.8748E−02 | 1.0533E−02 | −1.2830E+00 | 5.0304E+00 | −1.1148E+01 |
| S3 | −6.5808E−02 | 1.4124E−01 | −1.1196E+00 | 4.2754E+00 | −9.6897E+00 |
| S4 | −8.7968E−02 | −1.8733E−01 | 8.4501E−01 | −2.0418E+00 | 2.5427E+00 |
| S5 | −1.8425E−01 | 1.1686E−01 | −1.1895E+00 | 2.7016E+00 | −3.3127E+00 |
| S6 | −1.1945E−01 | 2.4789E−02 | −1.4415E−01 | −9.3056E−01 | 3.9794E+00 |
| S7 | 4.5695E−02 | 5.0535E−02 | −5.1097E−02 | −1.0897E−01 | 2.1916E−01 |
| S8 | 2.6163E−01 | −1.3026E+00 | 3.2006E+00 | −5.3286E+00 | 6.0371E+00 |
| S9 | 3.7527E−01 | −1.3561E+00 | 2.5635E+00 | −3.2508E+00 | 2.7666E+00 |
| S10 | −9.1244E−02 | 5.7211E−02 | −3.0159E−02 | 8.4017E−03 | 3.5135E−04 |

| Surface number | A14 | A16 | A18 | A20 |
|---|---|---|---|---|
| S1 | −1.9793E+01 | 1.9021E+01 | −1.0053E+01 | 2.2464E+00 |
| S2 | 1.4362E+01 | −1.0541E+01 | 4.0465E+00 | −6.1154E−01 |
| S3 | 1.2754E+01 | −8.8351E+00 | 2.6353E+00 | −1.2329E−01 |
| S4 | −1.4413E+00 | 4.8103E−01 | −4.7206E−01 | 2.5968E−01 |
| S5 | 5.5505E−02 | 4.1848E+00 | −3.6948E+00 | 1.0036E+00 |
| S6 | −7.2512E+00 | 7.3398E+00 | −3.8651E+00 | 8.1989E−01 |
| S7 | 3.5354E−01 | −7.3176E−01 | 4.2109E−01 | −8.0765E−02 |
| S8 | −4.4150E+00 | 1.9473E+00 | −4.6057E−01 | 4.3406E−02 |
| S9 | −1.5504E+00 | 5.4698E−01 | −1.0963E−01 | 9.4761E−03 |
| S10 | −1.0458E−03 | 2.9475E−04 | −3.0063E−05 | 6.2041E−07 |

Figure 18A:
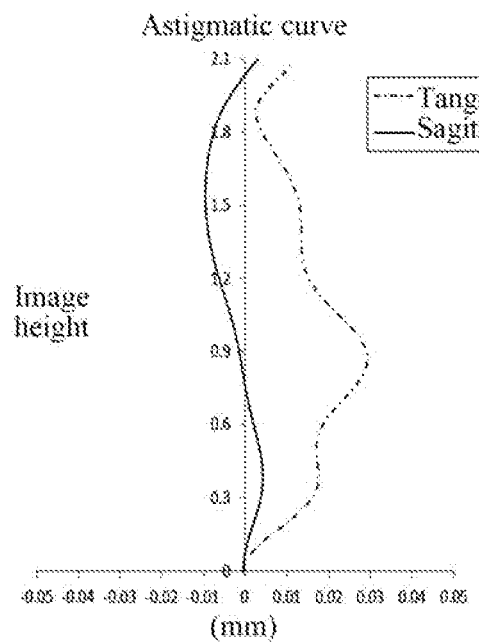
FIGS. 18A to 18C illustrate astigmatic curves, a distortion curve, and a relative illumination curve of the optical imaging system of the example 9, respectively.
Figure 18B:
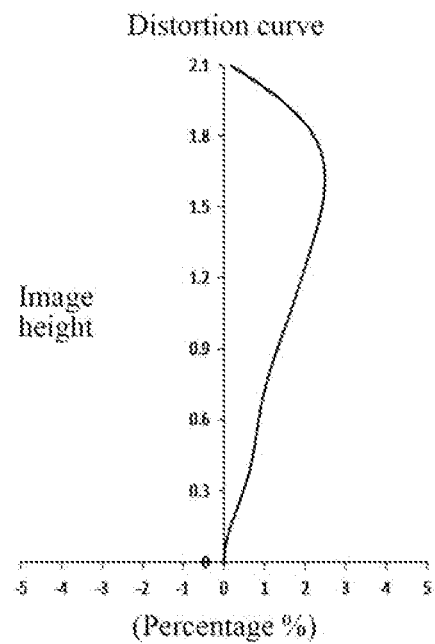
Figure 18C:
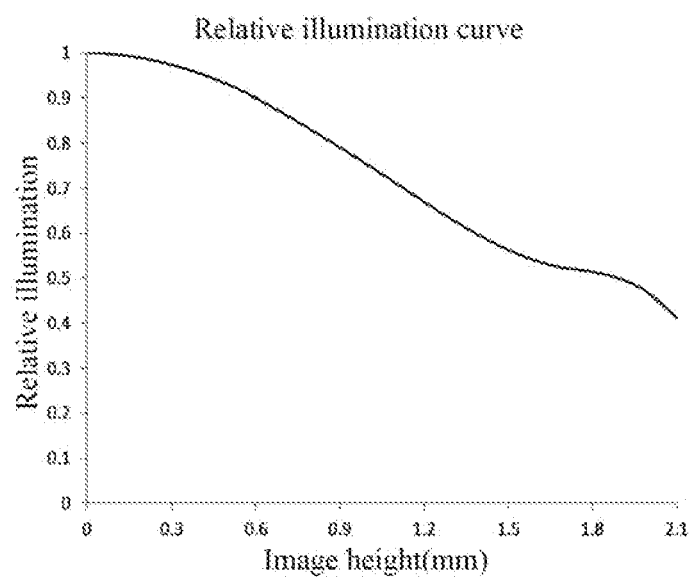

FIG. 18A illustrates astigmatic curves of the optical imaging system according to example 9, representing the curvatures of a tangential plane and the curvatures of a sagittal plane. FIG. 18B illustrates a distortion curve of the optical imaging system according to example 9, representing the amounts of distortion corresponding to different image heights. FIG. 18C illustrates a relative illumination curve of the optical imaging system according to example 9, representing the relative illumination corresponding to different image heights on the imaging plane. It can be seen from FIG. 18A to FIG. 18C that the optical imaging system provided in example 9 may achieve a good image quality.

In view of the above, examples 1 to 9 satisfy the relationship shown in Table 19.

TABLE 19

| Conditional | Example 1 | 2 | 3 | 4 | 5 | 6 | 7 | 8 | 9 |
|---|---|---|---|---|---|---|---|---|---|
| (SAG42 + SAG51)/Tr7r10 | −0.46 | −0.45 | −0.39 | −0.49 | −0.48 | −0.50 | −0.47 | −0.49 | −0.66 |
| f × TTL/EPD (mm) | 5.25 | 5.54 | 5.53 | 5.37 | 5.08 | 5.09 | 5.23 | 5.11 | 5.66 |
| f4/f | 1.22 | 1.24 | 1.00 | 1.34 | 1.33 | 1.30 | 1.50 | 1.25 | 0.83 |
| TTL (mm) | 4.06 | 4.20 | 4.16 | 4.18 | 3.99 | 4.04 | 4.01 | 3.90 | 4.10 |
| f/EPD | 1.29 | 1.32 | 1.33 | 1.28 | 1.27 | 1.26 | 1.30 | 1.31 | 1.38 |
| f1/f | 1.68 | 1.65 | 1.63 | 1.92 | 2.01 | 1.73 | 1.88 | 1.77 | 1.55 |
| R7/f | −0.51 | −0.51 | −0.63 | −0.56 | −0.55 | −0.51 | −0.54 | −0.55 | −0.48 |
| DISTmax (%) | 2.37 | 2.46 | 2.54 | 2.56 | 2.49 | 2.50 | 2.50 | 2.45 | 2.49 |
| T34/(T12 + T23) | 0.47 | 0.37 | 0.46 | 0.45 | 0.56 | 0.65 | 0.46 | 0.53 | 0.58 |
| 10 × T45/TD | 0.10 | 0.10 | 0.10 | 0.10 | 0.10 | 0.10 | 0.10 | 0.10 | 0.42 |
| CT2/CT4 | 0.30 | 0.28 | 0.32 | 0.28 | 0.28 | 0.31 | 0.28 | 0.33 | 0.41 |
| CT2/ET2 | 0.94 | 1.41 | 1.63 | 1.32 | 1.37 | 1.05 | 1.48 | 1.17 | 1.19 |
| DT12/DT21 | 1.13 | 1.00 | 0.99 | 1.00 | 0.98 | 1.00 | 0.99 | 1.00 | 1.00 |
| DT21/DT31 | 0.87 | 1.00 | 1.02 | 1.05 | 1.01 | 0.99 | 0.97 | 1.02 | 1.06 |

TABLE 19-continued

| Conditional | Example | | | | | | | | |
|---|---|---|---|---|---|---|---|---|---|
| | 1 | 2 | 3 | 4 | 5 | 6 | 7 | 8 | 9 |
| SAG21/CT2 | −0.42 | −0.56 | −0.56 | −0.44 | −0.14 | −0.45 | −0.69 | −0.46 | −0.45 |
| SAG31/CT3 | −0.75 | −0.87 | −0.89 | −0.27 | −0.72 | −0.54 | −0.88 | −0.51 | −0.42 |
| DT52/ImgH | 0.90 | 0.91 | 0.92 | 0.90 | 0.90 | 0.88 | 0.91 | 0.88 | 0.88 |

The present disclosure further provides an imaging apparatus, which is provided with an electronic photosensitive element for imaging. The electronic photosensitive element may be a photosensitive Charge-Coupled Device (CCD) or a Complementary Metal-Oxide Semiconductor (CMOS). The imaging apparatus may be an independent imaging device, such as a digital camera, or may be an imaging module integrated in a mobile electronic device, such as a mobile phone. The imaging apparatus is equipped with the optical imaging system described above.

The foregoing is only a description of the preferred examples of the present disclosure and the applied technical principles. It should be appreciated by those skilled in the art that the protective scope of the present disclosure is not limited to the technical solutions formed by the particular combinations of the above technical features. The protective scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, sequentially from an object side to an image side along an optical axis, comprising:
   a first lens having a positive refractive power and a convex object-side surface;
   a second lens having a refractive power;
   a third lens having a refractive power;
   a fourth lens having a positive refractive power, a concave object-side surface and a convex image-side surface; and
   a fifth lens having a negative refractive power,
   wherein −1<(SAG42+SAG51)/Tr7r10<−0.3,
   where SAG42 is an axial distance from an intersection of the image-side surface of the fourth lens and the optical axis to a vertex of an effective radius of the image-side surface of the fourth lens, SAG51 is an axial distance from an intersection of an object-side surface of the fifth lens and the optical axis to a vertex of an effective radius of the object-side surface of the fifth lens, and Tr7r10 is a distance along the optical axis from the object-side surface of the fourth lens to an image-side surface of the fifth lens;
   wherein −0.9<SAG31/CT3<−0.2,
   where SAG31 is an axial distance from an intersection of an object-side surface of the third lens and the optical axis to a vertex of an effective radius of the object-side surface of the third lens, and CT3 is a center thickness of the third lens along the optical axis.

2. The optical imaging system according to claim 1, wherein f×TTL/EPD<6 mm,
   where f is a total effective focal length of the optical imaging system, EPD is an entrance pupil diameter of the optical imaging system, and TTL is a distance along the optical axis from the object-side surface of the first lens to an imaging plane of the optical imaging system.

3. The optical imaging system according to claim 1, wherein 0.8<f4/f≤1.5,
   where f4 is an effective focal length of the fourth lens, and f is a total effective focal length of the optical imaging system.

4. The optical imaging system according to claim 1, wherein TTL<4.5 mm,
   where TTL is a distance along the optical axis from the object-side surface of the first lens to an imaging plane of the optical imaging system.

5. The optical imaging system according to claim 1, wherein f/EPD<1.5,
   where f is a total effective focal length of the optical imaging system, and EPD is an entrance pupil diameter of the optical imaging system.

6. The optical imaging system according to claim 1, wherein 1.5<f1/f<2.1,
   where f1 is an effective focal length of the first lens, and f is a total effective focal length of the optical imaging system.

7. The optical imaging system according to claim 1, wherein −0.8<R7/f<−0.3,
   where R7 is a radius of curvature of the object-side surface of the fourth lens, and f is a total effective focal length of the optical imaging system.

8. The optical imaging system according to claim 1, wherein DISTmax<3%,
   where DISTmax is a maximum distortion of the optical imaging system.

9. The optical imaging system according to claim 1, wherein 0.35<T34/(T12+T23)<0.7,
   where T12 is a spaced interval between the first lens and the second lens along the optical axis, T23 is a spaced interval between the second lens and the third lens along the optical axis, and T34 is a spaced interval between the third lens and the fourth lens along the optical axis.

10. The optical imaging system according to claim 1, wherein 10×T45/TD<0.5,
    where T45 is a spaced interval between the fourth lens and the fifth lens along the optical axis, and TD is a spaced interval from the object-side surface of the first lens to the image-side surface of the fifth lens.

11. The optical imaging system according to claim 1, wherein 0.2<CT2/CT4<0.5,
    where CT2 is a center thickness of the second lens along the optical axis, and CT4 is a center thickness of the fourth lens along the optical axis.

12. The optical imaging system according to claim 1, wherein 0.9<CT2/ET2<1.65,
    where CT2 is a center thickness of the second lens along the optical axis, and ET2 is an edge thickness of the second lens.

13. The optical imaging system according to claim 1, wherein 0.9<DT12/DT21<1.2, where DT12 is an effective half-aperture of an image-side surface of the first lens, and DT21 is an effective half-aperture of an object-side surface of the second lens.

14. The optical imaging system according to claim 1, wherein $0.8<DT21/DT31<1.2$,
where DT21 is an effective half-aperture of an object-side surface of the second lens, and DT31 is an effective half-aperture of an object-side surface of the third lens.

15. The optical imaging system according to claim 1, wherein $-0.7<SAG21/CT2<0$,
where SAG21 is an axial distance from an intersection of an object-side surface of the second lens and the optical axis to a vertex of an effective radius of the object-side surface of the second lens, and CT2 is a center thickness of the second lens along the optical axis.

16. The optical imaging system according to claim 1, wherein $0.8<DT52/ImgH<1$,
where DT52 is an effective half-aperture of the image-side surface of the fifth lens, and ImgH is a half of a diagonal length of an effective pixel area on an imaging plane of the optical imaging system.

17. An optical imaging system, sequentially from an object side to an image side along an optical axis, comprising:
a first lens having a positive refractive power and a convex object-side surface;
a second lens having a refractive power;
a third lens having a refractive power;
a fourth lens having a positive refractive power, a concave object-side surface and a convex image-side surface; and
a fifth lens having a negative refractive power,
wherein $f \times TTL/EPD<6$ mm, and
$f/EPD<1.5$,
where f is a total effective focal length of the optical imaging system, EPD is an entrance pupil diameter of the optical imaging system, and TTL is a distance along the optical axis from the object-side surface of the first lens to an imaging plane of the optical imaging system;
wherein $-0.9<SAG31/CT3<-0.2$,
where SAG31 is an axial distance from an intersection of an object-side surface of the third lens and the optical axis to a vertex of an effective radius of the object-side surface of the third lens, and CT3 is a center thickness of the third lens along the optical axis.

18. The optical imaging system according to claim 17, wherein $-1<(SAG42+SAG51)/Tr7r10<-0.3$,
where SAG42 is an axial distance from an intersection of the image-side surface of the fourth lens and the optical axis to a vertex of an effective radius of the image-side surface of the fourth lens, SAG51 is an axial distance from an intersection of an object-side surface of the fifth lens and the optical axis to a vertex of an effective radius of the object-side surface of the fifth lens, and Tr7r10 is a distance along the optical axis from the object-side surface of the fourth lens to an image-side surface of the fifth lens.

19. The optical imaging system according to claim 17, wherein $DISTmax<3\%$,
where DISTmax is a maximum distortion of the optical imaging system.

* * * * *